United States Patent
Kim et al.

(10) Patent No.: US 10,339,929 B2
(45) Date of Patent: Jul. 2, 2019

(54) SPEECH RECOGNITION USING ACOUSTIC FEATURES IN CONJUNCTION WITH DISTANCE INFORMATION

(71) Applicant: Google Inc., Mountain View, CA (US)

(72) Inventors: Chan Woo Kim, San Jose, CA (US); Rajeev Conrad Nongpiur, Palo Alto, CA (US); Vijayaditya Peddinti, San Jose, CA (US); Michiel Bacchiani, Summit, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/634,863

(22) Filed: Jun. 27, 2017

(65) Prior Publication Data

US 2018/0374477 A1    Dec. 27, 2018

(51) Int. Cl.
*G10L 15/22*    (2006.01)
*G10L 15/24*    (2013.01)
(Continued)

(52) U.S. Cl.
CPC ............ *G10L 15/22* (2013.01); *G06T 7/60* (2013.01); *G10L 15/00* (2013.01); *G10L 15/02* (2013.01);
(Continued)

(58) Field of Classification Search
CPC .................... G10L 15/24; G10L 2015/226
See application file for complete search history.

(56) References Cited

U.S. PATENT DOCUMENTS

| 10,019,140 B1* | 7/2018 | Bell .................. G06F 3/0484 |
| 2003/0018475 A1* | 1/2003 | Basu .................. G06K 9/00228 |
| | | 704/270 |

(Continued)

FOREIGN PATENT DOCUMENTS

| EP | 0883877 A1 | 12/1998 |
| EP | 2559030 A1 | 2/2013 |

OTHER PUBLICATIONS

Hossain et al., "A Real-Time Face to Camera Distance Measurement Algorithm Using Object Classification" 1st International Conference on Computer & Information Engineering, Nov. 26-27, 2015, 4 pp.

(Continued)

*Primary Examiner* — Bryan S Blankenagel
(74) *Attorney, Agent, or Firm* — Middleton Reutlinger

(57) ABSTRACT

An example method includes receiving, by a computing system, an indication of one or more audible sounds that are detected by a first sensing device, the one or more audible sounds originating from a user; determining, by the computing system and based at least in part on an indication of one or more signals detected by a second sensing device, a distance between the user and the second sensing device; determining, by the computing system and based at least in part on the indication of the one or more audible sounds, one or more acoustic features that are associated with the one or more audible sounds; and determining, by the computing system, and based at least in part on the one or more acoustic features and the distance between the user and the second sensing device, one or more words that correspond to the audible sounds.

12 Claims, 8 Drawing Sheets

(51) Int. Cl.
*G10L 15/06* (2013.01)
*G10L 15/02* (2006.01)
*G10L 25/78* (2013.01)
*G06T 7/60* (2017.01)
*G10L 15/00* (2013.01)

(52) U.S. Cl.
CPC ............ *G10L 15/063* (2013.01); *G10L 15/24* (2013.01); *G10L 25/78* (2013.01); *G10L 2015/226* (2013.01); *G10L 2015/227* (2013.01)

(56) References Cited

U.S. PATENT DOCUMENTS

| | | | | |
|---|---|---|---|---|
| 2008/0049020 | A1* | 2/2008 | Gusler | G06F 3/012 345/427 |
| 2011/0224979 | A1* | 9/2011 | Raux | G10L 15/07 704/233 |
| 2012/0214590 | A1* | 8/2012 | Newhouse | G06F 3/011 463/31 |
| 2013/0021459 | A1 | 1/2013 | Vasilieff et al. | |
| 2014/0161270 | A1* | 6/2014 | Peters | G10L 25/51 381/63 |
| 2015/0058003 | A1 | 2/2015 | Mohideen et al. | |
| 2015/0066500 | A1* | 3/2015 | Gomez | G10L 15/20 704/233 |
| 2015/0364139 | A1 | 12/2015 | Dimitriadis et al. | |
| 2015/0378433 | A1* | 12/2015 | Savastinuk | G06K 9/00255 345/156 |
| 2016/0005394 | A1 | 1/2016 | Hiroe | |
| 2016/0203828 | A1* | 7/2016 | Gomez | G10L 15/20 704/226 |

OTHER PUBLICATIONS

"Acoustic Features for Speech Recognition: From Mel-Frequency Cepstrum Coefficients (MFCC) to BottleNeck Features(BNF)" [PowerPoint], First Accessed on Apr. 26, 2017. Retrieved from the Internet: <djj.ee.ntu.edu.tw/Acoustic_Features.pptx> 26 pp.

Miao et al., "Distance-Aware DNNs for Robust Speech Recognition," The 16th Annual Conference of the International Speech Communication Association, Sep. 6-10, 2015, 5 pp.

International Searching Authority; International Search Report and Written Opinion of PCT Ser. No. PCT/US2018/039590; 15 pages; dated Sep. 20, 2018.

* cited by examiner

SPEECH RECOGNITION USING ACOUSTIC FEATURES IN CONJUNCTION WITH DISTANCE INFORMATION

BACKGROUND

Speech recognition and voice-assistant systems are typically configured to receive audible input from one or more users, perform speech recognition operations on the received input to identify one or more spoken words, and perform one or more operations based on the identified words. For example, a voice-assistant system may receive audible input from a user, perform speech recognition on the received input to determine that the user has asked a question, and perform one or more operations to provide the user with an answer (e.g., visual or audible answer) to the question. In some cases, if the user has spoken a command, the system may perform the requested command or send the command to another system for handling. Such systems are typically implemented on dedicated devices or on general-purpose computing devices such as smartphones, tablet computers, or personal computers.

These systems typically use acoustic models during the speech recognition process. Training applications are often configured to train these acoustic models prior to their use for real-time speech recognition. These training applications often train the acoustic model using various different environmental conditions (e.g., background noise, room size, room shape), they often use a room simulator application to generate simulated, audible sounds. The room simulation application is typically a software system that is capable of generate such simulate audio under various environmental conditions.

SUMMARY

In general, the present disclosure describes techniques for performing speech recognition using distance information associated with a user's location, in conjunction with acoustic features that are associated with detected audible input from the user, to identify one or more spoken words of the user that correspond to the audible input. A computing system may perform the speech recognition process and may, in various cases, perform one or more actions based on the identified words. The present techniques may be implemented for both near-field and far-field speech recognition. In the past, far-field speech recognition has been more challenging that near-field speech recognition due to various environment factors such as reverberation and noise. The disclosed techniques address this challenge by implementing a speech recognition process that determines not only certain acoustic features associated with the audible sounds of the user detected by a first sensing device (e.g., microphone), but also an approximate distance between a second sensing device (e.g., camera) and the user, where the first and second sensing devices may be in relative proximity to one another. As one example, a computing system may reliably measure the distance between the user and the second sensing device by determining the detected head size or the detected distance between the two eyes of the user. The disclosed techniques use both distance information and the acoustic features associated with the audible sounds to determine one or more words spoken by the user, such as by using a feature stacking or feature mapping implementation, as described in more detail below. As a result, the disclosed techniques provide a potentially more accurate and more efficient speech recognition process that is also more robust with respect to environment factors such as reverberation and noise.

In one example, a method includes receiving, by a computing system having one or more processors, an indication of one or more audible sounds that are detected by a first sensing device, the one or more audible sounds originating from a user, and determining, by the computing system and based at least in part on an indication of one or more signals detected by a second sensing device, a distance between the user and the second sensing device, the second sensing device being different from the first sensing device. The example method further includes determining, by the computing system and based at least in part on the indication of the one or more audible sounds, one or more acoustic features that are associated with the one or more audible sounds, and determining, by the computing system, and based at least in part on the one or more acoustic features and the distance between the user and the second sensing device, one or more words that correspond to the one or more audible sounds.

In one example, a computing system includes at least one processor and at least one computer-readable storage device. The at least one computer-readable storage device stores instructions that, when executed by the at least one processor, cause the at least one processor to receive an indication of one or more audible sounds that are detected by the first sensing device, the one or more audible sounds originating from a user, and determine, based at least in part on an indication of one or more signals detected by a second sensing device, a distance between the user and the second sensing device. The instructions, when executed by the at least one processor, further cause the at least one processor to determine, based at least in part on the indication of the one or more audible sounds, one or more acoustic features that are associated with the one or more audible sounds, and determine, based at least in part on the one or more acoustic features and the distance between the user and the second sensing device, one or more words that correspond to the one or more audible sounds.

In one example, a computer-readable storage device stores instructions that, when executed by at least one processor of a computing system, cause the at least one processor to perform operations including receiving an indication of one or more audible sounds that are detected by a first sensing device, the one or more audible sounds originating from a user, and determining, based at least in part on an indication of one or more signals detected by a second sensing device, a distance between the user and the second sensing device, the second sensing device being different from the first sensing device. The operations further include determining, based at least in part on the indication of the one or more audible sounds, one or more acoustic features that are associated with the one or more audible sounds, and determining, based at least in part on the one or more acoustic features and the distance between the user and the second sensing device, one or more words that correspond to the one or more audible sounds.

The details of one or more examples are set forth in the accompanying drawings and the description below. Other features, objects, and advantages of the disclosure will be apparent from the description and drawings, and from the claims.

DETAILED DESCRIPTION

Figure 1:
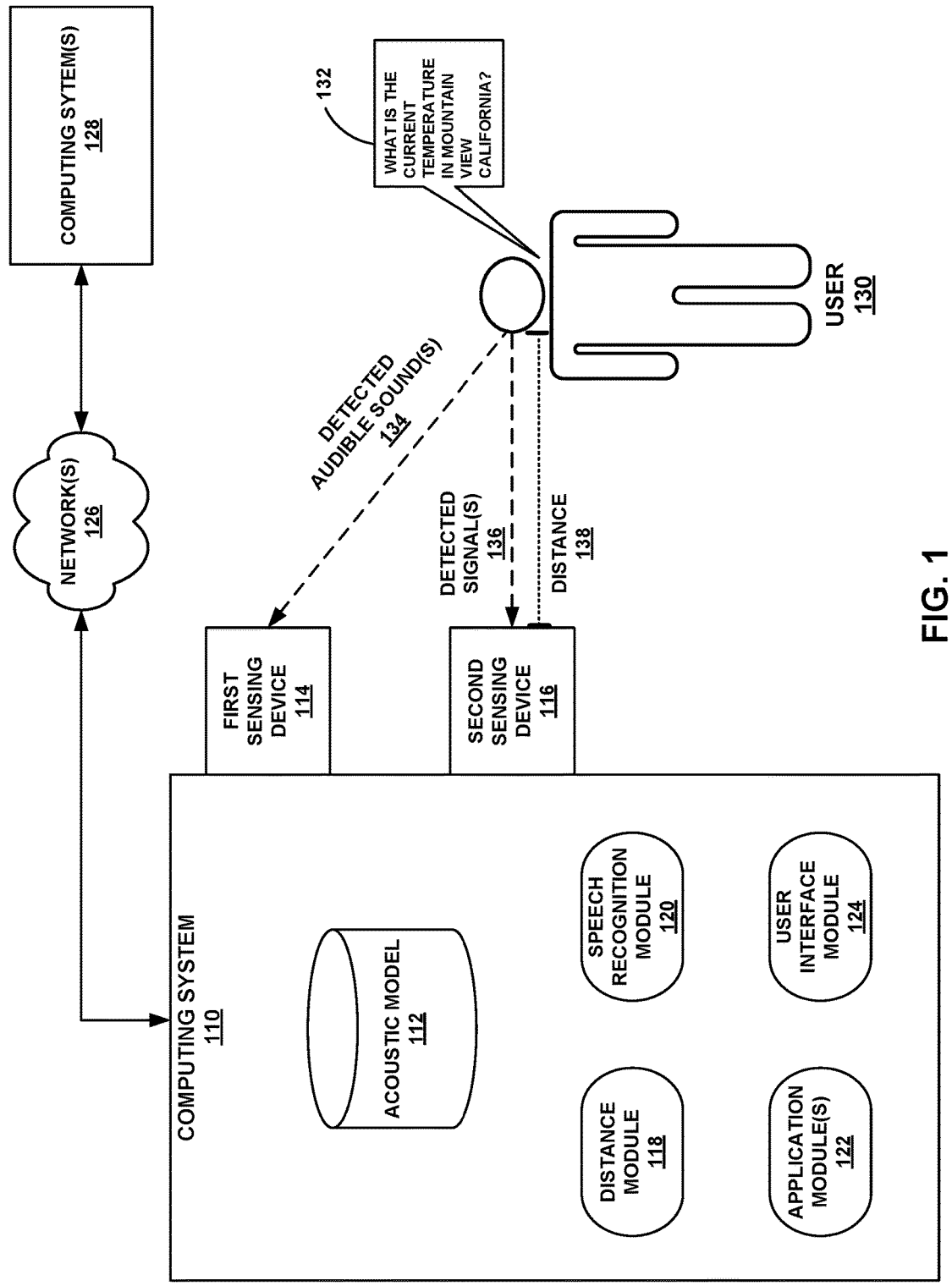
FIG. 1 is a conceptual diagram illustrating an example computing system that is configured to determine one or more words of a user, in accordance with one or more aspects of the present disclosure.

FIG. 1 is a conceptual diagram illustrating an example computing system 110 that is configured to determine one or more words of a user 130, in accordance with one or more aspects of the present disclosure. Computing system 110 may represent a mobile device (e.g., smart phone, tablet computer, laptop computer, computerized watch, computerized eyewear, computerized gloves), a personal computer, a smart television, or any other type of computing device that is capable of processing speech input from user 130. For example, non-limiting examples of computing system 110 include desktop computers, televisions, personal digital assistants, portable gaming systems, media players, mobile television platforms, automobile navigation and entertainment systems, vehicles (e.g., automobiles, aircrafts) and/or cockpit displays, or any other types of wearable, non-wearable, mobile, or non-mobile computing devices. In certain examples, computing system 110 may be a voice-assistant system that receives user commands, processes the commands based on speech recognition operations, and performs corresponding actions. Such a voice-assistant system may or may not include a display device.

Computing system 110 may include or otherwise be communicatively coupled with a first sensing device 114 and a second sensing device 116. In some examples, one or both of first sensing device 114 and second sensing device 116 are included in computing system 110. In some examples, one or both of first sensing device 114 and second sensing device 116 are external to computing system 110 but are communicatively coupled (e.g., via one or more wired or wireless communication channels) to computing system 110. In these examples, when external to computing system 110, first sensing device 114 and/or second sensing device 116 may be part of or otherwise included in one or more computing devices/systems that are in relative proximity to one another.

Computing system 110 may also include an acoustic model 112, a distance module 118, a speech recognition module 120, one or more application modules 122, and a user interface module 124. Modules 118, 120, 122, and 124 may perform operations described herein using software, hardware, firmware, or a mixture of hardware, software, and/or firmware residing in and/or executing at computing system 110. For example, one or more processors of computing system 110 may execute instructions that are stored in a memory or other non-transitory storage device of computing system 110 to perform the operations of modules 118, 120, 122, and 124. In some examples, computing system 110 may execute modules 118, 120, 122, and 124 as virtual machines executing on underlying hardware. In some examples, modules 118, 120, 122, and 124 may execute as one or more services of an operating system or computing platform provided by computing system 110, or modules 118, 120, 122, and 124 may execute as one or more executable programs at an application layer of a computing platform provided by computing system 110.

In some examples, computing system 110 does not include a display device. In other examples, computing system 110 includes a display device. In these examples, such a display device may include a liquid crystal display (LCD), a dot matrix display, a light-emitting diode (LED) display, an organic light-emitting diode (OLED) display, an e-ink device, or similar monochrome or color display capable of outputting visible information to user 130 of computing system 110. In some examples, the display device of computing system 110 may comprise a presence-sensitive display that may include respective input and/or output functionality for computing system 110. In these examples, the display device may be implemented using various technologies. For instance, the display device may function as an input device using a presence-sensitive input screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive display technology.

As indicated in FIG. 1, computing system 110 includes distance module 118, one or more application modules 122, speech recognition module 120, and user interface module 124. In various examples, application modules 122 may be executable by one or more processors of computing system 110 to provide run-time functionality associated with application modules 122. Non-limiting examples of application modules 122 may include electronic message applications, camera applications, chat applications, Internet browser applications, mobile or desktop operating systems, social media applications, television applications, electronic games, and/or other types of applications, such as voice-assistant applications.

User interface module 124 may be configured to manage user interactions with one or more components of computing system 110. For example, user interface module 124 may act as an intermediary between various components of computing system 110 and user 130 to make determinations based on user input (e.g., user input detected by first sensing device 114, second sensing device 116, distance module 118, and/or speech recognition module 120) from user 130, and to generate output in response to the user input. User interface module 124 may receive instructions from an application, service, platform, or other module of computing system 110 (e.g., speech recognition module 120 and/or application modules 122) to cause computing system 110 to generate output (e.g., visual output at a display device, audio output at a speaker, information output to application modules 122). User interface module 124 may manage inputs received by computing system 110 as user 130 interacts with computing system 110, and may receive additional instructions from applications, services, platforms, or other modules (e.g., speech recognition module 120) of computing system 110 that process the user input. User interface module 124 may be further configured to provide one or more indications of such user input to an application, service, platform, or other module of computing system 110 (e.g., to application modules 122).

Computing system 110 is configured to process speech input from user 130 and, in various examples, perform speech recognition on such input. For example, in some cases, first sensing device 114 of computing system 110 may include a microphone. Computing system 110 may receive an indication of one or more audible sounds 134 that are detected by first sensing device 114. For example, after detecting audible sounds 134, first sensing device 114 may generate information, such as one or more signals, which represent or otherwise correspond to audible sounds 134, and may provide the information to one or more processors of computing system 110 as an indication of audible sounds 134. Audible sounds 134 originate from user 130 and may represent one or more spoken words. Speech recognition module 120 of computing system 110 is configured to use acoustic model 112 to identify these words that are based on audible sounds 134 detected by first sensing device 114.

According to various examples described herein, speech recognition module 120 is configured to utilize and/or process information received from first sensing device 114 only after receiving explicit authorization from user 130 to do so. For instance, according to these examples, computing system 110 may provide user 130 (e.g., via user interface module 124) with detailed information about the requested use of data collected by first sensing device 114 for speech recognition, in conjunction with the use of specified functions or applications (e.g., one or more of application modules 122). Speech recognition module 120 may only use such data collected by first sensing device 114 after receiving explicit authorization from user 130 to do so. After receiving such authorization, speech recognition module 120 is configured only to use the data gathered by first sensing device 114 for use(s) authorized by user 130.

Rather than using audible sounds 134 as the sole input for the speech recognition process, however, speech recognition module 120 also uses distance information provided by distance module 118. Distance module 118 of computing system 110 is configured to determine a distance between computing system 110 and user 130. In particular, distance module 118 may be configured to determine a distance 138 between user 130 and second sensing device 116 based at least in part on an indication of one or more signals 136 detected by second sensing device 116. For example, second sensing device 116 may include a camera or proximity sensor. Second sensing device 116 may detect signals 136 (e.g., signals inside and/or outside of the visible light spectrum) and may provide indications of signals 136 to distance module 118. Distance module 118 may use the indications of signals 136 to determine distance 138 between second sensing device 116 and user 130. As noted above, in some cases, first sensing device 114 and/or second sensing device 116 may be included in computing system 110. In some cases, however, first sensing device 114 and/or second sensing device 116 may be external to, and communicatively coupled with, computing system 110. In various examples, because both first sensing device 114 and second sensing device 116 each detect respective sounds 134 or signals 136 from user 130, where signals 136 are used to determine distance 138 to user 130, first sensing device 114 and second sensing device 116 may be located in relative proximity to one another.

In far-field speech recognition, it has been frequently observed that the distance between the microphone and the user is highly related to the effect from reverberation. Even if the reverberation time remains the same, sound sources farther from the microphone may be more affected by the reverberation. In addition, distance is highly correlated with the sound pressure level of a received signal and any surrounding noise levels. These observations suggest that the distance information may be used as a useful feature for far-field speech recognition, as well as for near-field speech recognition.

As one non-limiting example, when second sensing device 116 is a camera, second sensing device 116 may detect signals 136 that emanate from and/or around user 130. In many cases, second sensing device 116 may provide signals 136 to a camera application (e.g., one of application modules 122) that is capable of rendering still images and/or moving images based on signals 136. However, second sensing device 116 may also provide signals 136 to distance module 118, which is configured to determine distance 130 between user 130 and second sensing device 116.

According to various examples described herein, distance module 118 is configured to utilize and/or process information received from second sensing device 116 only after receiving explicit authorization from user 130 to do so. For instance, according to these examples, computing system 110 may provide user 130 (e.g., via user interface module 124) with detailed information about the requested use of data collected by second sensing device 116 for distance calculations only, in conjunction with the use of specified functions (e.g., speech recognition performed by speech recognition module 120) or applications (e.g., one or more of application modules 122). Distance module 118 may only use such data collected by second sensing device 116 after receiving explicit authorization from user 130 to do so. After receiving such authorization, distance module 118 is configured only to use the data gathered by second sensing device 114 for the use(s) authorized by user 130.

In some cases, distance module 118 may be configured to approximate a distance between both eyes of user 130 based on signals 136, such as when, for example, user 130 is located closer to second sensing device 116. However, in other cases (e.g., when user 130 is located farther away from second sensing device 116), distance module 118 may be configured to approximate a size of a head of user 130, and/or the size of other body parts of user 130, based on signals 136. Based on the size of one or more body parts of user 130 and/or the approximate distance between both eyes of user 130, distance module 118 may be able to determine distance 138 between user 130 and second sensing device 116, and may provide distance information to speech recognition module 120.

Speech recognition module 120 may be configured to determine, based at least in part on the indication of audible sounds 134, one or more acoustic features that are associated with audible sounds 134. These acoustic features may include any type of features that are associated with acoustic or waveform properties of audible sounds 134. Non-limiting examples of such acoustic features may include one or more of a Mel-Frequency Cepstral Coefficient feature, a Perceptual Linear Prediction feature, a Filter-bank Coefficients feature, a Complex Fast Fourier Transform feature, or a raw waveform feature associated with audible sounds 134.

Based at least in part on these determined acoustic features and determined distance 138 between user 130 and second sensing device, speech recognition module 120 may be configured to determine one or more words that correspond to audible sounds 134. In various examples, speech recognition module 120 may utilize acoustic model 112 in determining these words spoken by user 130. Acoustic model 112 may associate pre-defined features, such as pre-defined acoustic features and/or pre-defined distance features, with pre-defined words. In various cases, acoustic model 112 may be trained from previously received audible sounds that correspond to the pre-defined words identified in acoustic model 112. The training of acoustic model 112 may occur on computing system 110 or on a separate, external system (e.g., one or more of computing systems 128 shown in FIG. 1). Details regarding the training of acoustic model 112, such as, for example, through the use of a speech simulation application, will be described in further detail below.

Speech recognition module 120 may provide the determined acoustic features that are associated with audible sounds 134, as well as distance 138 between user 130 and second sensing device 116, as input into acoustic model 112. Responsive to providing these inputs into acoustic model 112, speech recognition module 120 may then receive, as output from acoustic model 112, the one or more words that correspond to audible sounds 134.

In some cases, speech recognition module 120 may determine a particular distance feature, for use with acoustic model 112, which is associated with distance 138. The distance feature determined by speech recognition module 120 may be one of the pre-defined distance features includes in acoustic model 112. Speech recognition module 120 may determine, based at least in part on the determined distance feature and on the determined acoustic features associated with audible sounds 134, at least one pre-defined acoustic feature from the group of pre-defined acoustic features that are included in acoustic model 112. Based at least in part on the at least one pre-defined acoustic feature, speech recognition module 120 is configured to determine the one or more words from the pre-defined words in acoustic model 112, where the one or more words correspond to audible sounds 134 detected by first sensing device 114. As will be described in further detail below, speech recognition module 120 may utilize distance features and acoustic features with respect to acoustic model 112 in a variety of different ways. For example, in some cases, speech recognition module 120 may identify words from acoustic model 112 based on a stacking of distance features with acoustic features in acoustic model 112. In other cases, speech recognition module 120 may identify words using feature mapping operations associated with acoustic features in acoustic model 112, to normalize dependencies on distance features. The details of these approaches are described in further detail below.

As one non-limiting example, as shown in FIG. 1, user 130 may speak one or more words 132, such as the question "What is the current temperature in Mountain View Calif.?" Based on spoken words 132, first sensing device 114 may detect audible sounds 134 originating from user 130 that correspond to spoken words 132. First sensing device 114 may provide an indication of audible sounds 134 to speech recognition module 120. Additionally, second sensing device 116 (e.g., camera, proximity sensor) may detect signals 136 based, for example, on the presence and proximity of user 130 to second sensing device 116. Second sensing device 116 may provide an indication of signals 136 to distance module 118.

Distance module 118 may determine distance 138 based on the indication of signals 136 provided by second sensing device 116, and may provide distance information for distance 138 to speech recognition module 120. Speech recognition module 120 may determine one or more acoustic features that are associated with audible sounds 134 corresponding to the words "What is the current temperature in Mountain View Calif.?" Speech recognition module 120 may then determine, based at least in part on these acoustic features and on distance 138, one or more words that correspond to audible sounds 134. In order to perform this determination, speech recognition module 120 may determine a distance feature from a group of pre-determined distance features included in acoustic model 112, where the distance feature corresponds to distance 138. Speech recognition module 120 may then provide, as input into acoustic model 112, this determined distance feature as well as the acoustic features associated with audible sounds 134 for words 132 that are spoken by user 130.

Based at least in part on the distance feature and the acoustic features, speech recognition module 120 may be configured to determine at least one pre-defined acoustic feature from a group of pre-defined acoustic features in acoustic model 112. For example, speech recognition module 120 may identify the at least one pre-defined acoustic feature based on one or more similarities between the at least one pre-defined acoustic feature and the acoustic features associated with audible sounds 134. The group of pre-defined acoustic features may be associated with pre-defined words that are included in or otherwise identified by acoustic model 112. Speech recognition module 120 may then determine, based on the at least one pre-defined acoustic feature, one or more words from the pre-defined words stored or identified in acoustic model 112. These one or more words correspond to the audible sounds 134. In this non-limiting example, the words determined by speech recognition module 120 from acoustic model 112 may be the words "What is the current temperature in Mountain View Calif.," which correspond to spoken words 132 that originated from user 130. By using both distance information in conjunction with acoustic feature information, speech recognition module 120 may potentially utilize acoustic model 112 to more quickly identify these words than through the use of acoustic feature information alone. In addition, in some instances, speech recognition module 120 may be able to more accurately identify these words by utilizing distance information and potentially reduce the number of false positive candidate words that may be identified through the use of acoustic feature information alone.

After determining the words from acoustic model 112, speech recognition module 120 may provide the determined words to one or more other modules or systems. For example, speech recognition module 120 may provide an indication of the determined words to user interface module 124 and/or application modules 122. User interface module 124 may output a representation of the determined words to user 130 (e.g., via a graphical user interface as a speech-to-text representation). User interface module 124 may also provide an indication of the determined words to application modules 122.

Application modules 122, as noted above, may include one or more applications executable by computing system 110, such as, for example, a contact manager application, a fitness application, a calendar application, a personal assistant or prediction engine, a search application, a camera application, a map or navigation application, a weather application, a smart television application, a transportation service application (e.g., a bus or train tracking application), a social media application, a camera application, a game application, an e-mail application, a chat or messaging application, an Internet browser application. After receiving the indication of the determined words from user interface module 124 and/or speech recognition module 120, one or more of application modules 122 may use the determined words as input to one or more operations performed by these modules (e.g., using the words "What is the current temperature in Mountain View Calif." as input text into an Internet browser application).

In some cases, application modules 122 may include a voice-assistant application. This voice-assistant application may be configured to perform commands or answer questions based on user input from user 130. After receiving input from speech recognition module 120, the voice-assistant application may be configured to perform certain operations using the input from speech recognition module 120, including invoking one or more other application modules 122 and providing result output back to user 130 (e.g., via user interface module 124). For example, in case shown in FIG. 1, user 130 speaks words 132 to ask the question "What is the current temperature in Mountain View Calif.?" After determining the words "What is the current temperature in Mountain View Calif.," speech recognition module 120 may provide these words to the voice-assistant application. In some cases, the voice-assistant application may be able to process the command or question directly, and may provide a response to user via user interface module 124 (e.g., visual or audible output corresponding to the current temperature at or around user 130). In other cases, the voice-assistant application may process the command or question by invoking another one of application modules 122, such as a weather application, to obtain the current temperature in in Mountain View Calif. The weather application and/or the voice-assistant application may output a response to the user via user interface module 124.

In some cases, computing system 110 may provide an indication of the determined words, including any queries or commands, to one or more external computing systems, such as one or more computing systems 128 shown in FIG. 1. Computing system 110 may be communicatively coupled to one or more computing systems 128 via one or more networks 126. Networks 126 may include one or more wireless or wired networks. Computing systems 128 may represent one or more of a mobile device, such as a smart phone, a tablet computer, a laptop computer, a computerized watch, computerized eyewear, computerized gloves, a personal computer, a smart television, a server device, or any other type of computing device. For example, non-limiting examples of computing systems 128 include desktop computers, server computers, televisions, personal digital assistants, portable gaming systems, media players, mobile television platforms, automobile navigation and entertainment systems, vehicles (e.g., automobile, aircraft, or other vehicle), vehicle cockpit displays, or any other types of wearable, non-wearable, mobile, or non-mobile computing devices.

In these cases, speech recognition module 120 may provide an indication of the recognized words to user interface module 124 and/or one or more of application modules 122, which may provide an indication of the recognized words, including any queries or commands, to computing system 128. Computing system 128 may be configured to process these queries or commands and provide a corresponding response back to user interface module 124 and/or one or more of application modules 122. For instance, continuing with the example above, based on the recognized words "What is the current temperature in Mountain View Calif.," speech recognition module 120 may provide an indication of these words to a weather application in application modules 122. The weather application may send a query or command to computing system 128 to retrieve an indication of the current temperature in Mountain View, Calif. Computing system 128 may be an external server that is wirelessly coupled to computing system 110 via networks 126. Computing system 128 may be configured to determine the current temperature in Mountain View, Calif. and provide an indication of this temperature back to the weather application included in application modules 122. The weather application may then output this indication of the temperature (e.g., using user interface module 124) to the user (e.g., via visual or audio feedback).

In some cases, based on recognized words determined by speech recognition module 120, one or more of application modules 122 may further send direct commands to computing system 128. For example, one or more of computing systems 128 may be included in a home of user 130. For instance, one of computing systems 128 may include a smart television or a server that is communicatively coupled to such a smart television. After receiving a response to the question "What is the current temperature in Mountain View Calif.," user 130 may wish to view the weather in various different areas on the smart television. In this non-limiting example, user 130 may issue a subsequent command to "Turn on the television and go to channel 155" (not shown in FIG. 1), where channel 155 happens to correspond to a particular weather channel. Speech recognition module 120 may recognize these words spoken by user 130 using the techniques described above. After recognizing these words, speech recognition module 120 may provide an indication of the recognized words to a television control application included in application modules 122. The television control application may then issue a command to the smart television in computing systems 128, via networks 126, to instruct the smart television to turn itself on and navigate to channel 155.

In various examples, as will be described in further detail below, computing system 110 and/or one or more of computing systems 128 may train acoustic model 112, which includes pre-defined distance and acoustic features that are associated with pre-defined words. For example, in some cases, a machine learning module (e.g., machine learning module 264 shown in FIG. 2, machine learning module 564 shown in FIG. 5) may be used to train acoustic model 112. In some cases, a speech simulation module (e.g., speech simulation module 565 shown in FIG. 5) may be used during the model training process to generate simulated audible sounds at various different distances from a speaker device. The speech simulation module may utilize different room configuration parameters (e.g., room size, room shape, microphone locations, noise levels) while generating the simulated audible sounds during the training of acoustic model 112. These modules will be described in further detail below in reference to FIGS. 2 and 5. In examples where one or more of computing systems 128 performs the model training process, these one or more of computing systems 128 may provide acoustic model 112 and/or updates to acoustic model 112 back to computing system 110 for use during execution of speech recognition module 120.

Thus, the techniques described herein enable speech recognition using both distance information associated with distance 138 between user 130 and computing system 110, as well as with acoustic features that are associated with detected audible sounds 134 from user 130, to identify one or more spoken words that correspond to audible sounds 134. The present techniques may be implemented for both near-field and far-field speech recognition. By using acoustic feature information in conjunction with distance information, including the use of feature stacking or feature mapping operations, speech recognition module 120 may identify spoken words with higher levels of accuracy and efficiency when compared to the use of acoustic feature information alone. The disclosed techniques may also provide a more robust solution with respect to environment factors such as reverberation and noise by accounting for both distance measurements and acoustic features during the speech recognition process.

Figure 2:
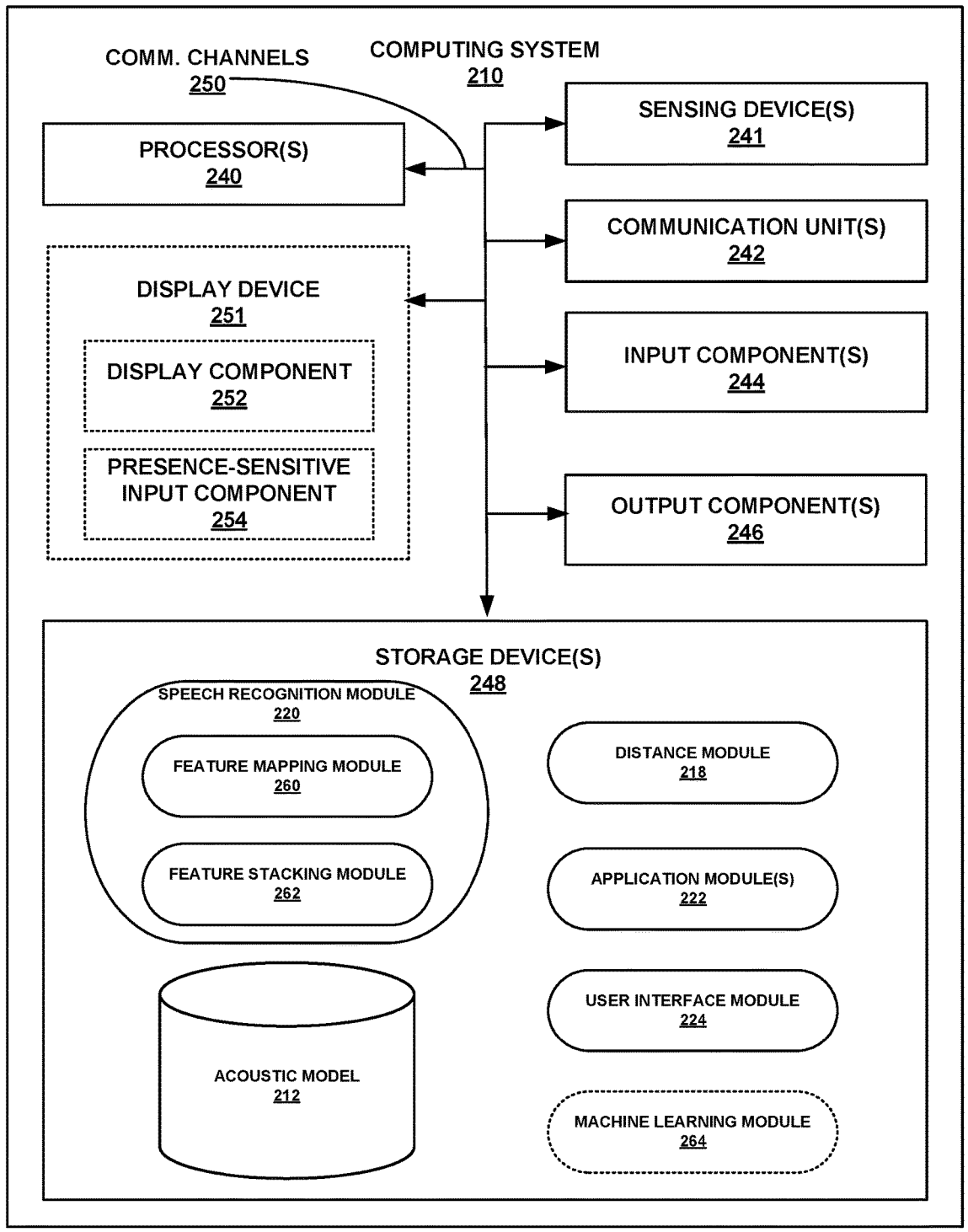
FIG. 2 is a block diagram illustrating further details of an example computing system, in accordance with one or more aspects of the present disclosure.

FIG. 2 is a block diagram illustrating an example computing system 210, in accordance with one or more aspects of the present disclosure. FIG. 2 illustrates only one particular example of computing system 210, and many other examples of computing system 210 may be used in other instances and may include a subset of the components shown in FIG. 2 or may include additional components not shown in FIG. 2. As one non-limiting example, computing system 210 may be one example of computing system 110 shown in FIG. 1.

As shown in FIG. 2, computing system 210 includes one or more processors 240, one or more sensing devices 241, one or more communication units 242, one or more input components 244, one or more output components 246, and one or more storage devices 248. In some examples, computing system 210 may include an optional display device 251. Display device 251 includes display component 252 and, in certain examples, may also include a presence-sensitive input component 254 (e.g., when display device comprises a presence-sensitive display device). Storage devices 248 of computing system 210 include a speech recognition module 220, a distance module 218, an acoustic model 212, one or more application modules 222, a user interface module 224, and, in some cases, an optional machine learning module 264. Communication channels 250 may interconnect each of 240, 241, 242, 244, 246, 248, and/or 251 for inter-component communications (physically, communicatively, and/or operatively). In some examples, communication channels 250 may include a system bus, a network connection, an inter-process communication data structure, or any other method for communicating data.

One or more communication units 242 of computing system 210 may communicate with external systems (e.g., computing systems 128 in FIG. 1) via one or more wired and/or wireless networks (e.g., networks 126 in FIG. 1) by transmitting and/or receiving network signals on the one or more networks. Examples of communication units 242 include a network interface card (e.g., an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

Speech recognition unit 220 may be one example of speech recognition module 120 shown in FIG. 1 and described above. Distance module 218 may be one example of distance module 118 shown in FIG. 1 and described above. Application modules 222 may be one example of application modules 122 shown in FIG. 1 and described above. User interface module 224 may be one example of user interface module 124 shown in FIG. 1 and described above. Acoustic model 212 may be one example of acoustic model 112 shown in FIG. 1 and described above.

Sensing devices 241 may include one or more sensing devices. Sensing devices 241 may include first and second sensing devices that are examples of first sensing device 114 and second sensing device 116 shown in FIG. 1. In some examples, however, where computing system 210 is one example of computing system 110, first sensing device 114 and/or second sensing device 116 may be external to computing system 210. In general, sensing devices 241 may include one or more cameras, microphones, infrared sensors, temperature sensors, movement sensors (e.g., accelerometers, gyroscopes), pressure sensors (e.g., barometers), ambient light sensors, or other sensors.

One or more input components 244 of computing system 210 may receive input. Examples of input are tactile, audio, and video input. Input components 244 of computing system 210, in one example, may include a presence-sensitive input device (e.g., a touch-sensitive screen), mouse, keyboard, voice responsive system, camera, microphone or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyroscopes), one or more pressure sensors (e.g., barometer), one or more ambient light sensors, and/or one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing system 110 may generate output. Examples of output are tactile, audio, and video output. Output components 246 of computing system 210, in one example, includes a PSD, sound card, video graphics adapter card, speaker, cathode ray tube (CRT) monitor, liquid crystal display (LCD), or any other type of device for generating output to a human or machine.

Optional display device 251 of computing system 210 includes display component 252 and, in some cases, presence-sensitive input component 254. Display component 252 may be a screen at which information is displayed, and, when included in display device 251 (e.g., when display device 251 comprises a presence-sensitive display device), presence-sensitive input component 254 may detect an object at and/or near display component 252. As one example range, presence-sensitive input component 254 may detect an object, such as a finger or stylus, which is within two inches or less of display component 252. Presence-sensitive input component 254 may determine a location (e.g., an [x, y] coordinate) of display component 252 at which the object was detected. In another example range, presence-sensitive input component 254 may detect an object six inches or less from display component 252. Other ranges are also possible. Presence-sensitive input component 254 may determine the location of display component 252 selected by a user's finger using capacitive, inductive, and/or optical recognition techniques. In some examples, presence-sensitive input component 254 also provides output to a user using tactile, audio, or video stimuli as described with respect to display component 252.

While illustrated as an internal component of computing system 210, display device 251 may also represent an external component that shares a data path with computing system 210 for transmitting and/or receiving input and output. For instance, in one example, display device 251 represents a built-in component of computing system 210 located within and physically connected to the external packaging of computing system 210 (e.g., a screen on a mobile phone). In another example, display device 251 represents an external component of computing system 210 located outside and physically separated from the packaging or housing of computing system 210 (e.g., a monitor, a projector, which shares a wired and/or wireless data path with computing system 210).

In examples where display device 251 comprises a presence-sensitive display, display device 251 may detect two-dimensional and/or three-dimensional gestures as input from a user of computing system 210. For instance, a sensor of display device 251 may detect a user's movement (e.g., moving a hand, an arm, a pen, a stylus) within a threshold distance of the sensor. Display device 251 may determine a two- or three-dimensional vector representation of the movement and correlate the vector representation to a gesture input (e.g., a hand-wave, a pinch, a clap, a pen stroke) that has multiple dimensions. In other words, display device 251 can detect a multi-dimension gesture without necessarily requiring the user to gesture at or near a screen or surface at which display device 251 outputs information for display. Instead, display device 251 can detect a multi-dimensional gesture performed at or near a sensor, which may or may not be located near the screen or surface at which display device 251 outputs information for display.

One or more processors 240 may implement functionality and/or execute instructions associated with computing system 210. Examples of processors 240 include application processors, display controllers, auxiliary processors, one or more sensor hubs, and any other hardware configure to function as a processor, a processing unit, or a processing device. Modules 218, 220, 222, 224, and/or 264 may be operable by processors 240 to perform various actions, operations, or functions of computing system 210. For example, processors 240 of computing system 210 may retrieve and execute instructions stored by storage devices 248 that cause processors 240 to perform the operations of modules 218, 220, 222, 224, and/or 264. The instructions, when executed by processors 240, may cause computing system 210 to store information within storage devices 248.

One or more storage devices 248 may store information for processing during operation of computing system 210 (e.g., computing system 210 may store data accessed by modules 218, 220, 222, 224, and/or 264 during execution at computing system 210). In some examples, storage devices 248 may include a temporary memory. Storage devices 248 may, in some examples, be at least partially configured for short-term storage of information as volatile memory. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248, in some examples, include one or more non-transitory computer-readable storage media. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with modules 218, 220, 222, 224, and/or 264. Storage components 248 may include a memory configured to store data or other information associated with modules 218, 220, 222, 224, and/or 264.

In some examples, user interface module 224 may receive an indication of one or more user inputs detected at display device 251 (e.g., when display device 251 comprises a presence-sensitive display), and may output information about the user inputs to development modules 232 and/or application modules 222. For example, display device 251 may detect a user input and send data about the user input to user interface module 224 over communications channels 250. User interface module 224 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density) about the user input.

Application modules 222 may comprise one example of application modules 222 shown in FIG. 1. Application modules 222 may represent various individual applications and services executing at and accessible from computing system 210. Numerous non-limiting examples of application modules 224 may exist and include a contact manager application, a fitness application, a calendar application, a personal assistant or prediction engine, a search application, a voice-assistant application, a smart television application, a map or navigation application, a transportation service application (e.g., a bus or train tracking application), a social media application, a camera application, a game application, a weather application, an e-mail application, a chat or messaging application, an Internet browser application, or any other applications that may execute at computing system 210.

As described above in reference to FIG. 1, speech recognition module 120 is configured to use acoustic model 112 and determine words based on audible sounds 134 from user 130. Speech recognition module 220, shown in FIG. 2, may function similarly to speech recognition module 120. Rather than using audible sounds (e.g., audible sounds 134 in FIG. 1) as the sole input for the speech recognition process, speech recognition module 220 also uses distance information provided by distance module 218, which may function similarly to distance module 118 described above.

Speech recognition module 220 may be configured to determine, based at least in part on the indication of audible sounds, one or more acoustic features that are associated with these audible sounds. These acoustic features may include any type of features that are associated with acoustic or waveform properties of the audible sounds. Based at least in part on these determined acoustic features and determined distance between a user and a sensing device (e.g., one of sensing devices 241, such as microphone), speech recognition module 220 may be configured to determine one or more words that correspond to these audible sounds. In various examples, speech recognition module 220 may utilize acoustic model 212 in determining these words spoken by the user. Acoustic model 212 is similar to acoustic model 112 shown in FIG. 1 and may associate pre-defined features, such as pre-defined acoustic features and/or pre-defined distance features, with pre-defined words. In various cases, acoustic model 212 may be trained from previously received audible sounds that correspond to the pre-defined words identified in acoustic model 212.

Speech recognition module 220 may provide the determined acoustic features that are associated with the audible sounds, as well as distance information, as input into acoustic model 212. Responsive to providing these inputs into acoustic model 212, speech recognition module 220 may then receive, as output from acoustic model 212, the one or more words that correspond to these audible sounds.

In some cases, speech recognition module 220 may determine a particular distance feature, for use with acoustic model 212, which is associated with a distance between the user and one of sensing devices 241 (e.g., microphone). The distance feature determined by speech recognition module 220 may be one of the pre-defined distance features includes in acoustic model 212. Speech recognition module 220 may determine, based at least in part on the determined distance feature and on the determined acoustic features associated with the audible sounds, at least one pre-defined acoustic feature from the group of pre-defined acoustic features that are included in acoustic model 212. Based at least in part on the at least one pre-defined acoustic feature, speech recognition module 220 is configured to determine the one or more words from the pre-defined words in acoustic model 212, where the one or more words correspond to the audible sounds.

Speech recognition module 220 may utilize distance features and acoustic features with respect to acoustic model 212 in a variety of different ways. For example, in some cases, speech recognition module 220 may utilize a feature stacking module 262, shown in FIG. 2, to identify words from acoustic model 212 based on a stacking of distance features with acoustic features in acoustic model 212. In other cases, speech recognition module 220 may utilize a feature mapping module 260 to identify words using feature mapping operations associated with acoustic features in acoustic model 212, to normalize dependencies on distance features. Speech recognition module 220 may determine whether to use feature mapping module 260 or feature stacking module 262, in some examples, based on the type and/or format of data included in acoustic model 212.

For example, if acoustic model 212 has been trained to include distance feature information that is stacked with acoustic feature information, speech recognition module 220 may use feature stacking module 262 to identify words from acoustic model 212 based on a stacking of these features. Distance features that are associated with respective distances may be stacked with acoustic features in acoustic model 212, such as shown in the example of FIG. 3.

Figure 5:
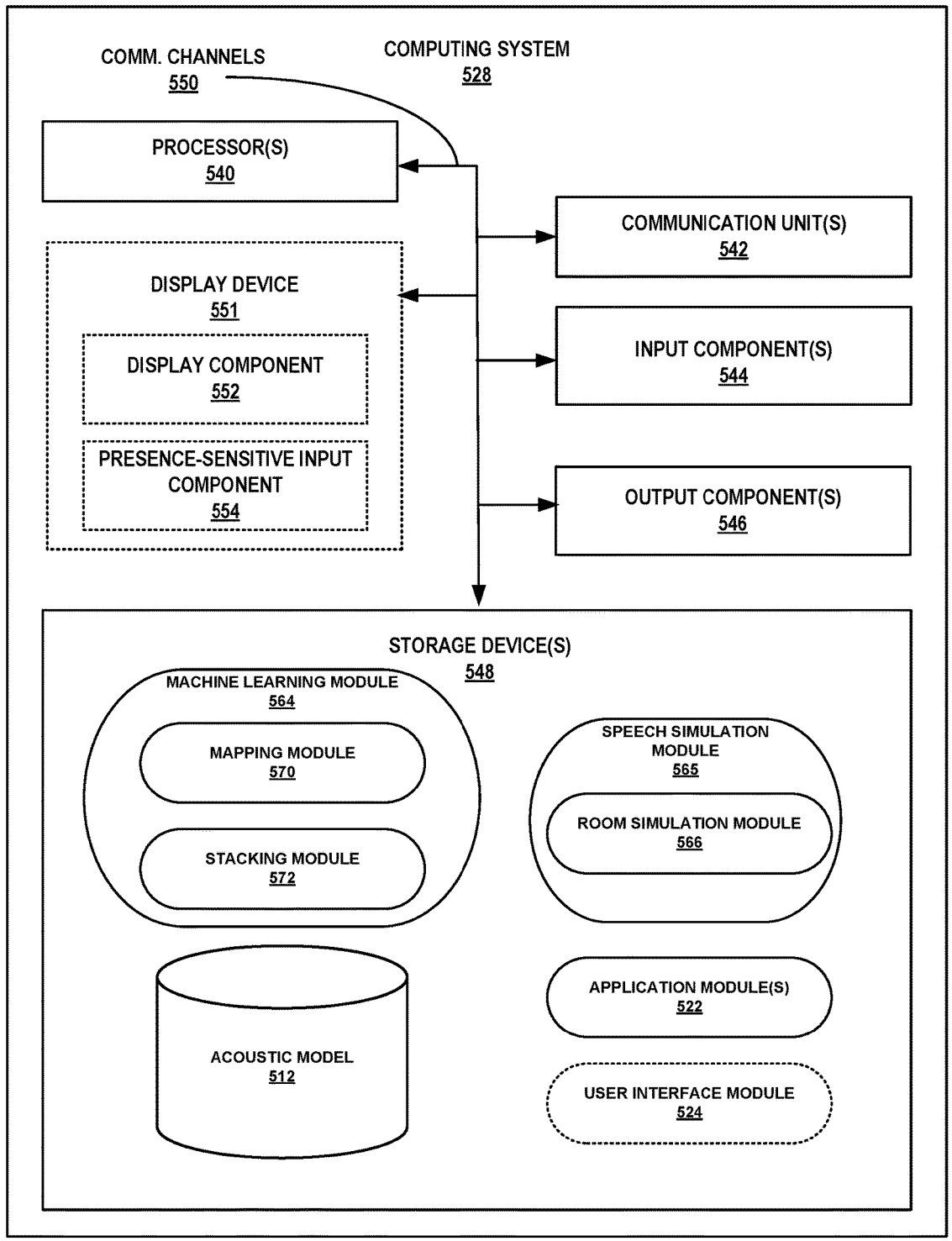
FIG. 5 is a block diagram illustrating further details of another example computing system, in accordance with one or more aspects of the present disclosure.

Storage devices 248 may also include an optional machine learning module 264. FIG. 5 provides one example (machine learning module 564) of machine learning module 264. Acoustic model 212 may be trained by machine learning module 264 that may use a speech simulation module (e.g., speech simulation module 565 shown in FIG. 5) to create simulated audible sounds from a simulated user at one or more distances to determine acoustic features that are associated with one or more distances. Machine learning module 264 may be configured to train acoustic model 212 based on acoustic feature information and distance information. As described previously, during the speech recognition process, speech recognition module 220 is configured to use feature mapping module 260 and/or feature stacking module 262 depending on the information included in acoustic model 212. Similar to speech recognition module 220, machine learning module 264 may, in some cases, also include a mapping module and a stacking module to train acoustic model 212, as will be described further below in reference to FIG. 5.

Machine learning module 264 may utilize a speech simulation module to train acoustic module 212 based on simulated speech. The speech simulation module may be configured to simulate audible sounds of one or more users, and may include a room simulation module (e.g., room simulation module 566 shown in FIG. 5), which is configured to simulate one or more parameters of a room in which simulated audible sounds are generated. One such parameter is distance between a simulated user and a simulated microphone. As a result, the speech simulation module of machine learning module 264 may use the room simulation module to generate simulated audible sounds, at various different distances between the simulated user and the simulated microphone, while training acoustic model 212.

Figure 3:
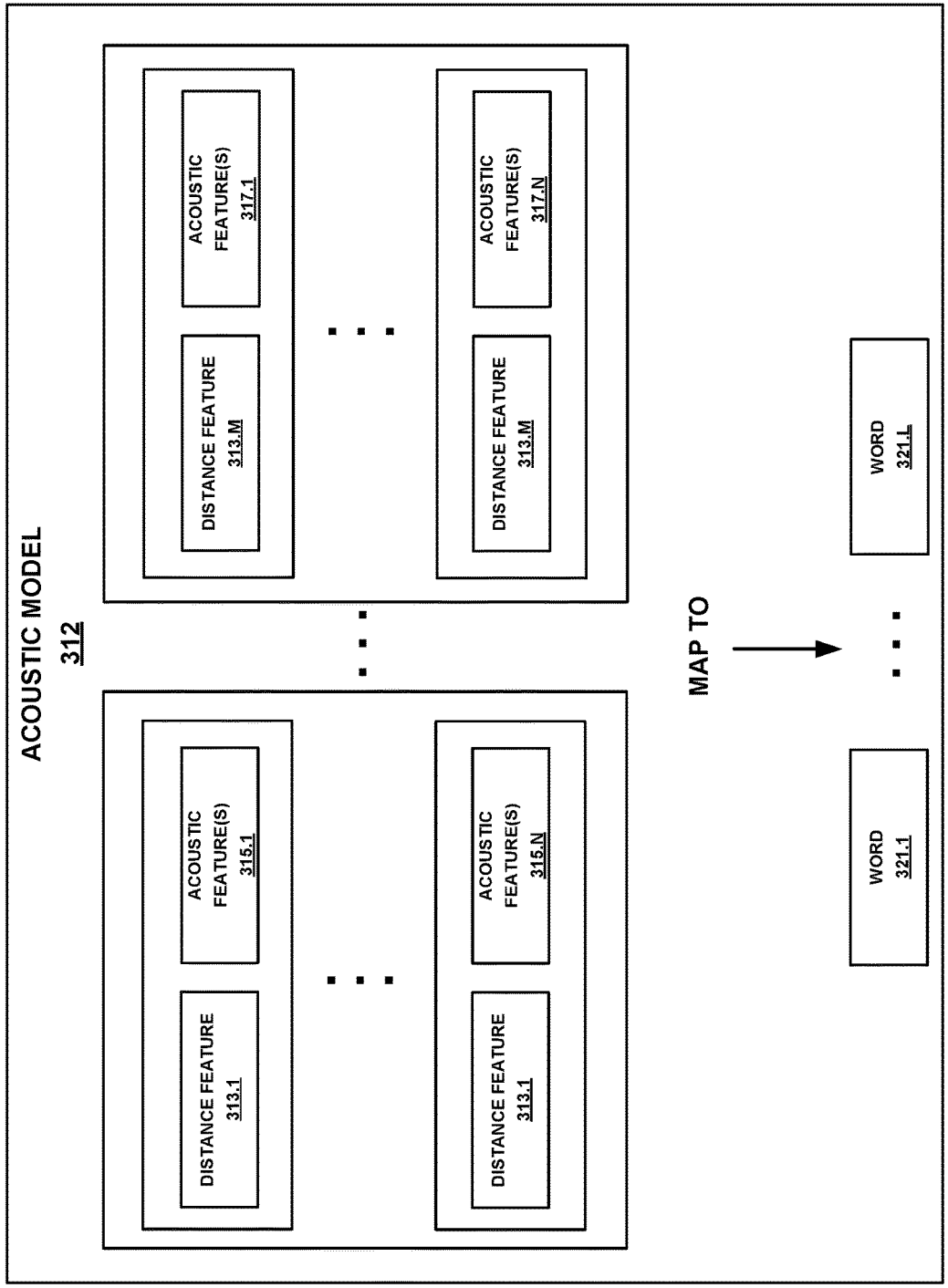
FIG. 3 is a conceptual diagram illustrating an example of information included or otherwise represented in an acoustic model, in accordance with one or more aspects of the present disclosure.

FIG. 3 is a conceptual diagram illustrating an example of information that may be included or otherwise represented in an acoustic model 312, in accordance with one or more aspects of the present disclosure. Acoustic model 312 may be one example of acoustic model 212 shown in FIG. 2. In FIG. 3, acoustic model 312 includes a representation of pre-defined distance features 313.1 through 313.M (collectively, "distance features 313"), a representation of pre-defined groups of acoustic features 315.1 through 315.N (collectively, "acoustic features 315") and 317.1 through 317.N (collectively, "acoustic features 317"), and a representation of pre-defined words 321.1 through 321.L (collectively, "words 321"). In FIG. 3, it is assumed, for purposes of illustration only, that there are N different groups of acoustic features in acoustic features 315, N different groups of acoustic features in acoustic features 317, M different distance features in distance features 313, and L different words represented in acoustic model 312, where L, M, and N may or may not be equal.

Each one of distance features 313 is associated with a particular distance, such as a distance between a user (e.g., user 130 in FIG. 1) and a sensing device (e.g., second sensing device 116 in FIG. 1) that detects signals for use in determining the distance. Each group of acoustic features 315 includes one or more acoustic features associated with particular features (e.g., acoustic or waveform properties) of an audible sound. As described earlier, non-limiting examples of such acoustic features may include one or more of a Mel-Frequency Cepstral Coefficient feature, a Perceptual Linear Prediction feature, a Filter-bank Coefficients feature, a Complex Fast Fourier Transform feature, or a raw waveform feature.

As shown in FIG. 3, each distance feature may be individually stacked or otherwise associated with one or more different groups of acoustic features 315 and/or 317 in acoustic model 312. For instance, a first distance feature 313.1 may be stacked or otherwise associated with a first group of one or more acoustic features 315.1 in acoustic model 312. In addition, the first distance feature 313.1 may be stacked or otherwise associated with a second, different group of one or more acoustic features 315.2. If there are N different groups of acoustic features 315, the first distance feature 313.1 may be individually stacked or otherwise associated with N different groups of acoustic features 315.1 through 315.N. Each group of acoustic features 315 may be associated, in some examples, with audible sounds detected at a distance that corresponds to distance feature 313.1.

Similarly, the Mth distance feature 313.M may be individually associated with each of the N different groups of acoustic features 317, as illustrated in FIG. 3. Each group of acoustic features 317 may be associated with audible sounds detected at a distance that corresponds to distance features 313.M. As will be described in more detail below in reference to FIG. 5, acoustic model 312 may be trained by a machine learning module (e.g., machine learning module 564) that uses a speech simulation module (e.g., speech simulation module 565) to create simulated audible sounds from a simulated user at one or more distances to determine acoustic features 315 associated with a first distance and acoustic features 317 associated with an Mth distance.

Referring again to FIG. 2, if acoustic model 212 is represented by example acoustic model 312 shown in FIG. 3, feature stacking module 262 may determine, based at least in part on a determined distance feature that corresponds to distance feature 313.1, and on determined acoustic features associated with the audible sounds detected by a user (e.g., user 130 in FIG. 1), at least one pre-defined acoustic feature from the group of pre-defined acoustic features 315 that are included in acoustic model 312. Based at least in part on the at least one pre-defined acoustic feature, speech recognition module 220 is configured to determine one or more words from pre-defined words 321 in acoustic model 312, where the one or more words correspond to the detected audible sounds.

For example, speech recognition module 220 may determine a distance feature associated with an identified distance (e.g., distance 138 in FIG. 1) between a user (e.g., user 130) and one of sensing devices 241 (e.g., second sensing device 116), as identified by distance module 218. Furthermore, speech recognition module 220 may determine one or more acoustic features that are associated with audible sounds (e.g., audible sounds 134) detected from the user. Speech recognition module 220 may use feature stacking module 262 to determine that the distance feature corresponds to pre-defined distance feature 313.1 included in acoustic model 312. Feature stacking module 262 may then identify one or more of pre-defined acoustic features in the groups of pre-defined acoustic features 315 that are stacked with pre-defined distance feature 313.1. Feature stacking module 262 may perform such identification by attempting to match one or more of pre-defined acoustic features in groups of acoustic features 315 with the determined acoustic features associated with the detected audible sounds from the user. For example, feature stacking module 262 may determine that particular acoustic features in groups of acoustic features 315 substantially match one or more of the acoustic features associated with the detected audible sounds from the user. Speech recognition module 220 is then configured to determine one or more words from pre-defined words 321 that are mapped in acoustic model 312 to the determined ones of acoustic features in groups of acoustic features 315. The words (e.g., "What is the current temperature in Mountain View Calif.") determined by speech recognition module 220 may correspond to the detected audible sounds (e.g., audible sounds 134 in FIG. 1) from the user.

In other examples, however, if acoustic model 212 has been trained to include acoustic feature information that is not stacked with distance feature information, speech recognition module 220 may instead use feature mapping module 260 to identify words from acoustic model 212 based these features. In these examples, feature mapping module 260 may identify words using feature mapping operations associated with acoustic features in acoustic model 212, to normalize dependencies on distance features. When speech recognition module 220 uses feature mapping module 260, acoustic model 212 may have a format such as shown in the example of FIG. 4.

Figure 4:
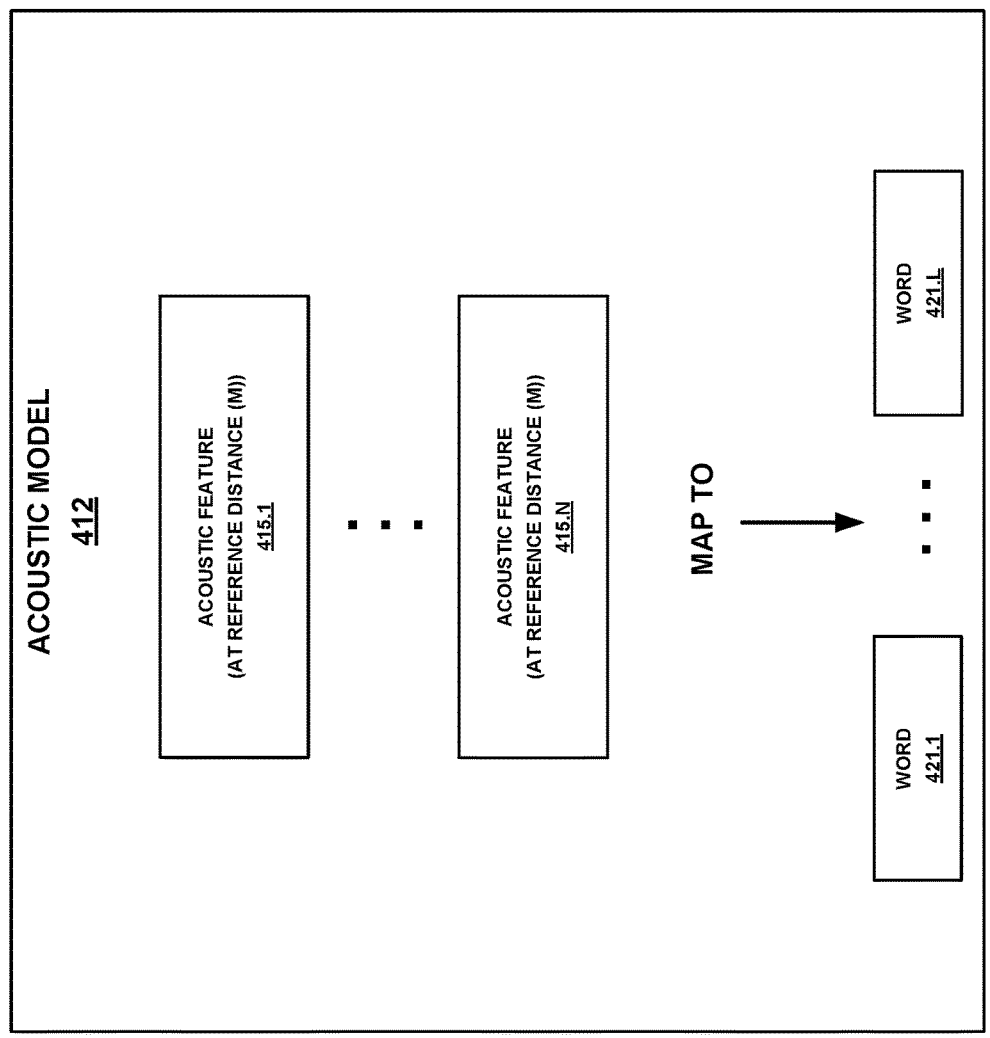
FIG. 4 is a conceptual diagram illustrating another example of information included or otherwise represented in an acoustic model, in accordance with one or more aspects of the present disclosure.

FIG. 4 is a conceptual diagram illustrating an example of information that may be included or otherwise represented in an acoustic model 412. Acoustic model 412 may be one example of acoustic model 212 shown in FIG. 2. In FIG. 4, acoustic model 412 includes a representation of N pre-defined groups of acoustic features 415.1 through 415.N (collectively, "acoustic features 415"). For example, acoustic model 412 illustrated in FIG. 4, each of the individual groups of acoustic features 415 may include one or more acoustic features. In addition, each of the individual groups of acoustic features is also associated with a reference "Distance (M)." For example, the reference "Distance (M)" may, in certain non-limiting cases, correspond to an average distance between a user and a sensing device (e.g., microphone) when training acoustic model 412, where the audible sounds detected from the user correspond to one or more of the groups of acoustic features 415. As will be described in more detail below in reference to FIG. 5, acoustic model 412 may be trained by a machine learning module (e.g., machine learning module 564) that uses a speech simulation module (e.g., speech simulation module 565) to create simulated audible sounds from a simulated user at one or more distances to determine acoustic features 415 that are associated with reference "Distance (M)" (e.g., an average of the one or more distances used by the speech simulation module).

In acoustic model 412, the groups of acoustic features 415 may be mapped to one or more words 421.1 through 421.L (collectively, "words 421"). In FIG. 4, it is assumed, for purposes of illustration only, that there are N different groups of acoustic features and L different words, where L and N may or may not be equal.

However, in order to utilize acoustic model 412, speech recognition module 220 of FIG. 2 may utilize feature mapping module 260 to map acoustic features that correspond to detected audible sounds of a user (e.g., user 130), at a particular distance (e.g., distance 138), to expected or normalized acoustic features at the reference "Distance (M)," which is the distance that corresponds to acoustic features 415. To do so, feature mapping module 260 may utilize a feature mapping function that is configured to perform such a mapping of determined acoustic features at a determined distance into normalized acoustic features at a reference "Distance (M)." In some cases, as will be further explained in reference to FIG. 5, a machine learning module may be used during model training to determine one or more such feature mapping functions, which may be stored in storage devices 248 and accessible by feature mapping module 260. In some cases, storage devices 248 and/or feature mapping module 260 may store or otherwise identify one or more pre-defined feature mapping functions that are accessible by feature mapping module 260.

For example, feature mapping module 260 may determine, based on a distance between a user (e.g., user 130 in FIG. 1) and one of sensing devices 241 (e.g., second sensing device 116), and further based on reference "Distance (M)," a feature mapping function. Feature mapping module 260 may then map, using the feature mapping function, one or more acoustic features associated with the one or more detected audible sounds (e.g., audible sounds 134 in FIG. 1) into one or more normalized acoustic features 415 at the reference "Distance (M)." By performing such a mapping or transformation of acoustic features into normalized features that are included in acoustic model 412, feature mapping module 260 is able to remove any dependency of acoustic features on distance. Feature mapping module 260 may then determine, based on the determined one or more of acoustic features 415, one or more of pre-defined words 421 in acoustic model 412 that correspond to the detected audible sounds of the user.

FIG. 5 is a block diagram illustrating an example computing system 528, in accordance with one or more aspects of the present disclosure. FIG. 5 illustrates only one particular example of computing system 528, and many other examples of computing system 528 may be used in other instances and may include a subset of the components shown in FIG. 5 or may include additional components not shown in FIG. 5. As one non-limiting example, computing system 528 may be an example of one or more of computing systems 128, shown in FIG. 1, which is used to train acoustic model 512 shown in FIG. 5. In another non-limiting example, computing system 528 may be an example of one or more of computing systems 110 shown in FIG. 1

As shown in FIG. 5, computing system 528 includes one or more processors 540, one or more communication units 542, one or more input components 544, one or more output components 546, and one or more storage devices 548. In some examples, computing system 528 may include an optional display device 551. Display device 551 includes display component 552 and, in certain examples, may also include a presence-sensitive input component 554 (e.g., when display device comprises a presence-sensitive display device). Storage devices 548 of computing system 528 include an acoustic model 512, one or more application modules 522, an optional user interface module 524, a machine learning module 564, and a speech simulation module 565. Communication channels 250 may interconnect each of 540, 542, 544, 546, 548, and/or 551 for inter-component communications (physically, communicatively, and/or operatively). In some examples, communication channels 550 may include a system bus, a network connection, an inter-process communication data structure, or any other method for communicating data.

Processors 540, communication units 542, input components 544, output components 546, display device 551, and storage devices 548 may be similar to processors 240, communication units 242, input components 244, output components 246, display device 251, and storage devices 248, respectively, shown in FIG. 2. Acoustic model 512, application modules 522, and optional user interface module 524 may be similar to acoustic module 212, application modules 222, and user interface module 224, respectively, shown in FIG. 2. In some examples, acoustic model 512 may have a format similar to acoustic model 312 (FIG. 3) or acoustic model 412 (FIG. 4).

Machine learning module 564 may be configured to train acoustic model 512 based on acoustic feature information and distance information. As described previously in reference to FIG. 2, during the speech recognition process, speech recognition module 220 is configured to use feature mapping module 260 and/or feature stacking module 262 depending on the information included in acoustic model 212. Acoustic model 512 shown in FIG. 5 may be one example of acoustic model 212. (In some examples, computing system 528 is an example of computing system 210. In other examples, computing system 528 is external to computing system 210. In these examples, computing system 528 may train acoustic model 512 and provide the trained model 512 to computing system 210, for use as acoustic model 212.)

Similar to speech recognition module 220 in FIG. 2, machine learning module 564 shown in FIG. 5 also includes two modules: a mapping module 570 and a stacking module 572. Mapping module 570 and stacking module 572 may be used to train acoustic model 512. Stacking module 572 trains acoustic model 512 using stacking of distance and acoustic features. FIG. 3 illustrates an example of acoustic model 312 that has been trained using the stacking of distance and acoustic features, as described previously. In FIG. 3, each individual distance feature included in distance features 313 is stacked or otherwise associated with each individual group of acoustic features in groups of acoustic features 315 and/or acoustic features 317.

Machine learning module 564 may utilize a speech simulation module 565 to train acoustic module 512 based on simulated speech. Speech simulation module 565 may be configured to simulate audible sounds of one or more users. Speech simulation module 565 may include a room simulation module 566, which is configured to simulate one or more parameters of a room in which simulated audible sounds are generated. One such parameter is distance between a simulated user and a simulated microphone. As a result, speech simulation module 565 may use room simulation module 566 to generate simulated audible sounds at various different distances between the simulated user and the simulated microphone, such as shown in the example of FIG. 6.

Figure 6:
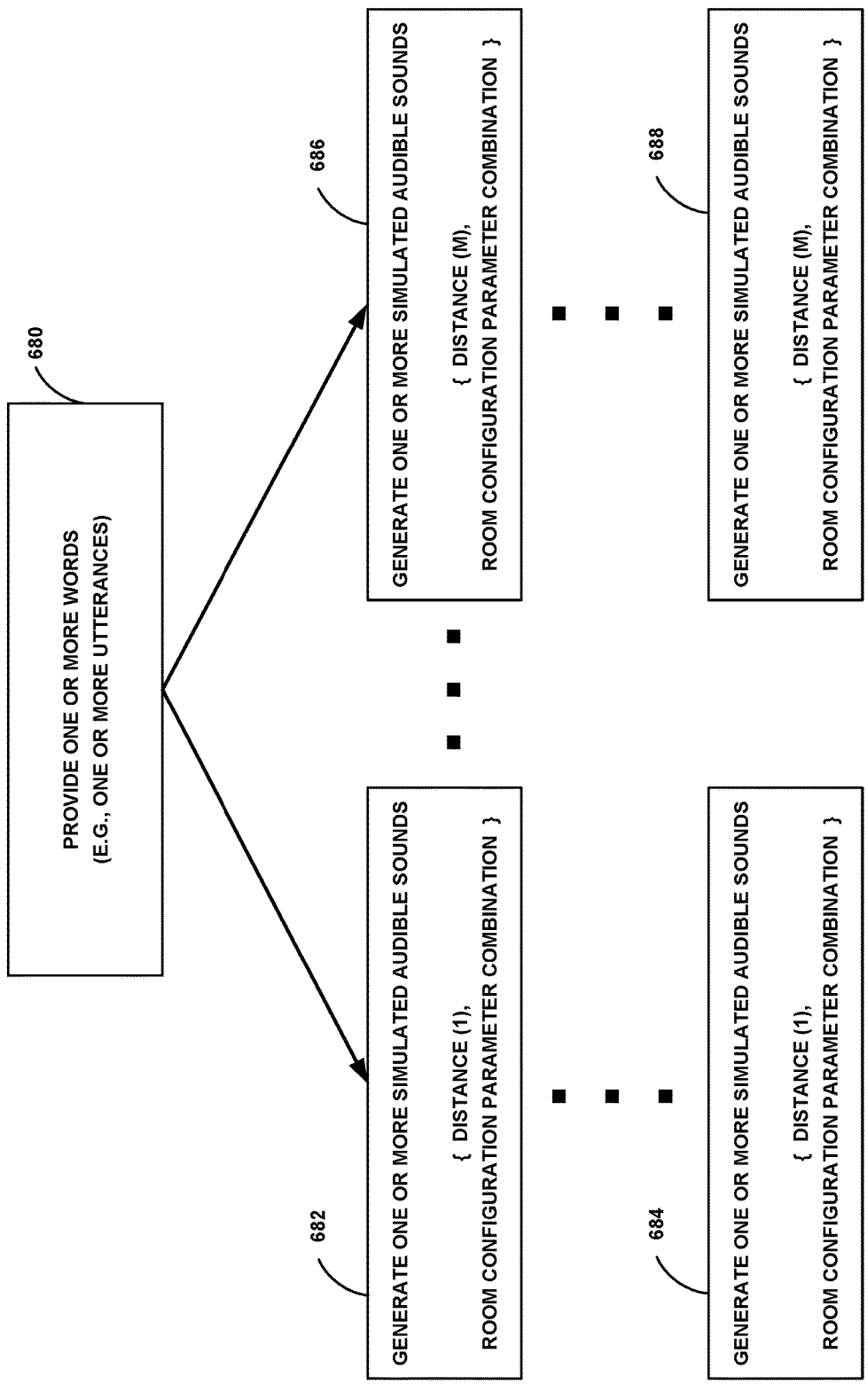
FIG. 6 is a conceptual diagram illustrating the example generation of simulated audible sounds at different distances, in accordance with one or more aspects of the present disclosure.

FIG. 6 is a conceptual diagram illustrating the example generation of simulated audible sounds at different distances, in accordance with one or more aspects of the present disclosure. Referring both to FIG. 5 and FIG. 6, in various examples, speech simulation module 565 may use room simulation module 566 to generate the simulated audible sounds illustrated in FIG. 6. Machine learning module 564 may then train acoustic model 512, which may be an example of acoustic model 212 (FIG. 2), acoustic model 312 (FIG. 3), and/or acoustic model 412 (FIG. 4).

As shown in FIG. 6, speech simulation module 565 may provide (680) one or more words (e.g., one or more utterances) as input to room simulation module 566. In some examples, these words may be associated with clean, close-talking or near-field utterances. Room simulation module 566 is capable of configuring various different room configuration parameters of a simulated room in which a simulated user may produce simulated audible sounds. For example, room simulation module 566 may configure a simulated room size, a simulated distance between a user and one or more microphones, simulated microphone locations, a simulated room shape, and a simulated amount of room background (e.g., ambient) noise, to list only a few non-limiting room configuration parameters. Each of the room configuration parameters may affect one or more acoustic features associated with simulated audible sounds that are generated by a simulated user in the simulated room.

Room simulation module 566 may generate one or more simulated audible sounds based on the same input words provided by speech simulation module 565. Room simulation module 566 may generate these simulated audible sounds based on any number of different simulated distances between a simulated user and a simulated microphone, and further based on any number of different room configuration parameter combinations, such as combinations that include one or more of the example room configuration parameters described above.

For example, room simulation module 566 may generate (682, 684) one or more simulated audible sounds from the same set of words input by speech recognition module 565 based on a first simulated distance ("Distance (1)") and any number of different room configuration parameter combinations. Furthermore, room simulation module 566 may generate (686, 688) one or more simulated audible sounds from the same set of words input by speech recognition module 565 based on an Mth distance ("Distance (M)") and any number of different room configuration parameter combinations.

In various examples, a user of computing system 528 may create or customize the room configuration parameters used by room simulation module 566 during execution of speech simulation module 565. Room simulation module 566 is capable of configuring and/or modifying one or more of the configuration parameters during execution of speech simulation module 565. As a result, speech simulation module 565 is configured to generate simulated audible sounds based on various different distances between the simulated user and the simulated microphone(s), and based on various different room configuration parameters that are determined by room simulation module 566, where each of the different generated simulated audible sounds correspond to the same input words provided by speech simulation module 565.

As one non-limiting example, speech simulation module 565 may use room simulation module 566 to generate simulated audible sounds corresponding to the input word "California" based on a first distance parameter and a first room size configuration parameter determined by room simulation module 566. Speech simulation module 565 may then generate simulated audible sounds corresponding to the same input word "California" based on the first distance parameter and a second, different room size parameter. Due to the different room size parameters, the audible sounds corresponding to the word "California" that are generated based on the first distance parameter and the first room size configuration parameter may have slightly different acoustic features than the audible sounds corresponding to the word "California" that are generated based on the first distance parameter and the second room size configuration parameter.

Continuing with this non-limiting example, speech simulation module 565 may also use room simulation module 566 to generate simulated audible sounds corresponding to the input word "California" based on a second, different distance parameter and the first room size configuration parameter determined by room simulation module 566, as well as generating simulated audible sounds corresponding to the same input word "California" based on the second distance parameter and the second room size parameter. The simulated audible sounds corresponding to the word "California" that are generated based on the second distance parameter and the first room size configuration parameter may have slightly different acoustic features than the audible sounds corresponding to the word "California" that are generated based on the second distance parameter and the second room size configuration parameter. These audible sounds may also have different acoustic features than the audible sounds generated based on the first distance parameter and the first or second room size configuration parameters.

As a result, machine learning module 564 (FIG. 5) may train acoustic model 512 based on a large group of acoustic features that are determined based on the simulated audible sounds generated using various different distances and various different room configuration parameters. Speech simulation module and room simulation module 566 may generate these simulated audible sounds for use by machine learning module 564 (e.g., such as shown in the example of FIG. 6).

Stacking module 572 of machine learning module 564 may determine acoustic features that are associated with the various different simulated audible sounds, and may also determine distance features that are associated with distances that are simulated by room simulation module 566 during generation of these audible sounds. Stacking module 572 may then train acoustic model 512 by stacking the determined distance features with the determined acoustic features (e.g., such as shown in the example acoustic model 312 shown in FIG. 3). For example, in the example above, stacking module 572 may determine acoustic features that are associated with the audible sounds corresponding to the word "California" at the first distance using one or more room configuration parameter combinations, and may determine a first distance feature associated with the first distance. Stacking module 572 may then individually stack each of these determined acoustic features (e.g., one or more groups of groups of acoustic features 315 in the example of FIG. 3) with the determined distance feature (e.g., distance feature 313.1). Stacking module 572 may also determine acoustic features that are associated with the audible sounds corresponding to the word "California" at the second distance using one or more room configuration parameter combinations, and may determine a second distance feature associated with the second distance. Stacking module 572 may then individually stack each of these determined acoustic features (e.g., one or more groups of groups of acoustic features 317 in the example of FIG. 3) with the determined distance feature (e.g., distance feature 313.M).

In other examples, machine learning module 564 may use mapping module 570 to train acoustic model 512. In these examples, mapping module 570 trains acoustic model 512 based on determined acoustic features at a reference distance, such as shown in FIG. 4. Acoustic model 412 may be one example of acoustic model 512 in FIG. 5 when machine learning module 564 uses mapping module 570 to train acoustic model 512. As described above in reference to FIG. 4, acoustic model 412 includes various different groups of acoustic features 415.1 through 415.N that are each associated with reference "Distance (M)." In some examples, such as reference "Distance (M)" may be one of the distances (e.g., "Distance (M)") used by speech simulation module 565 and room simulation module 566 to generate simulated audible sounds as shown in the example of FIG. 6).

The use of mapping module 570 to train acoustic model 512 such as shown in the example of FIG. 4 normalizes any dependency of the groups of acoustic features 415.1 through 415.N on distance, because these acoustic features are associated instead with a particular reference distance. In such fashion, the acoustic features are not dependent on various different individual distance features, but are instead associated with a given reference distance.

Because detected audible sounds may occur at various distances over time, different from the reference distance, mapping module 570 is also configured to determine one or more feature mapping functions that map acoustic features associated with audible sounds detected at a particular distance to normalized acoustic features associated with the reference distance. These feature mapping functions may later be used during the speech recognition process, as described previously with reference to feature mapping module of speech recognition module 220 (FIG. 2).

To train acoustic model 512 and determine such feature mapping functions, mapping module 570 may use speech simulation module 565 and room simulation module 566, as described above, to generate simulated audible sounds at various different distances, including the reference distance. In some examples, the average distance of the distances used by room simulation module 566 may comprise the reference distance.

During operation, mapping module 570 may use speech simulation module 565 and room simulation module 566 to generate audible sounds first at the reference distance (e.g., "Distance (M)" in the example of FIG. 6). Room simulation module 566 may, in various examples, also use various other room configuration parameters in generating the simulated audible sounds at the reference distance, such as shown in the example of FIG. 6. For example, room simulation module 566 may use a first combination of room configuration parameters that includes the reference distance, and may use a second combination of room configuration parameters that also includes the reference distance. The first combination of room configuration parameters may include the reference distance, a first room size parameter, and a first set of microphone locations, to list only a few non-limiting examples. The second combination of room configuration parameters may include the reference distance, a second room size parameter, and a second set of microphone locations. Speech simulation module 565 may cause room simulation module 566 each of these combinations of room configuration parameters when generating simulated audible sounds of a simulated user at the reference distance.

Mapping module 570 may also use speech simulation module 565 and room simulation module 566 to generate audible sounds corresponding to the same spoken words at various other distances, different from the reference distance (e.g., "Distance (1)" in the example of FIG. 6). Room simulation module 566 may, in various examples, also use various other room configuration parameters in generating the simulated audible sounds for the different distances, similar to described above. As a result, mapping module 570 causes speech simulation module 565 and room simulation module 566 to generate audible sounds corresponding to the same input spoken words at various different distances, including the reference distance, and also possibly using other variants of different room configuration parameters.

For example, mapping module 570 may receive, from speech simulation module 565 and/or room simulation module 566, an indication of a first group of audible sounds associated with a first distance feature, where the first group of audible sounds correspond to one or more spoken words (e.g., one or more utterances). In some cases, the first group of audible sounds are further associated with a first group of room configuration parameters also determined by room simulation module 566.

Mapping module may also receive, from speech simulation module 565 and/or room simulation module 566, an indication of a second group of audible sounds associated with a second distance feature, where the second group of audible sounds also correspond to the same one or more spoken words (e.g., the same one or more utterances). This second distance feature may be associated with a second, reference distance that is different from the first distance, as determined by room simulation module 566. The second group of audible sounds may, in some cases, be further associated with a second group of room configuration parameters that are determined room simulation module 566. Mapping module 570 may identify one or more feature mapping functions based on acoustic features that are associated with these groups of audible sounds, such as illustrated in the example of FIG. 7.

Figure 7:
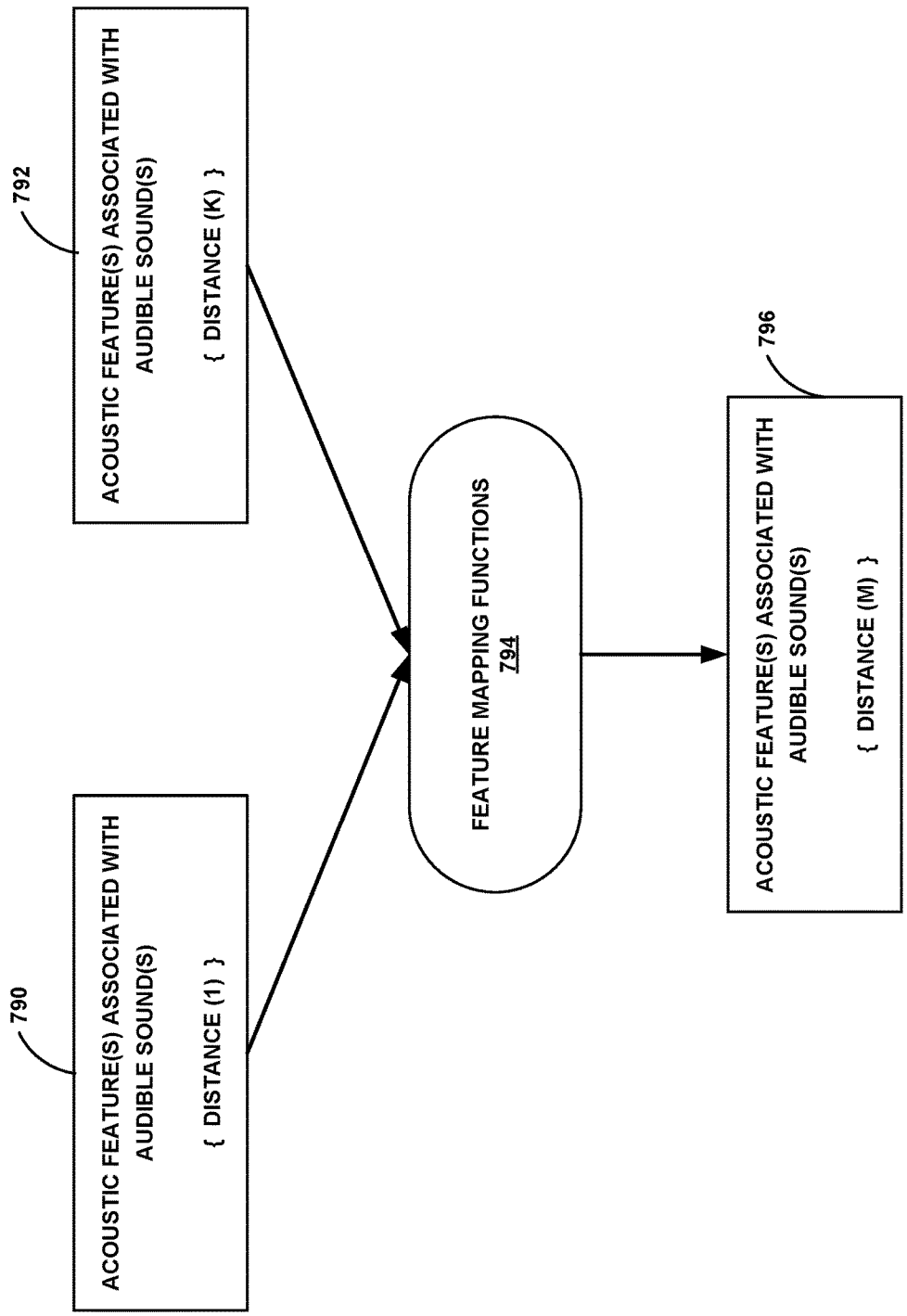
FIG. 7 is a conceptual diagram illustrating example feature mapping functions, in accordance with one or more aspects of the present disclosure.

FIG. 7 is a conceptual diagram illustrating example feature mapping functions 694, in accordance with one or more aspects of the present disclosure. Referring both to FIG. 5 and FIG. 7, mapping module 570 may determine, based at least in part on the indication of the first group of audible sounds, one or more first groups of acoustic features (e.g., acoustic features 790 in FIG. 7) that are associated with the first group of audible sounds. These acoustic features are also associated with the first distance (e.g., "Distance (1)" in FIG. 7). Mapping module 570 also determines, based at least in part on the indication of the second group of audible sounds, one or more second groups of acoustic features (e.g., acoustic features 796) that are associated with the second group of audible sounds. These acoustic features are also associated with the second, reference distance (e.g., "Distance (M)" in FIG. 7).

Based at least in part on the one or more first groups of acoustic features and on the one or more second groups of acoustic features, mapping module 570 may determine, based on one or more machine learning operations (e.g., operations associated with LSTM (Long Short-Term Memory) networks), one or more feature mapping functions (e.g., one or more feature mapping functions included in feature mapping functions 794 shown in FIG. 7) that are configured to map the one or more first groups of acoustic features associated with the first distance feature to the one or more second groups of acoustic features associated with the second distance feature. Mapping module 570 may store these feature mapping functions in storage devices 548 and/or otherwise provide (e.g., transmit) these feature mapping functions for use by a speech recognition module, which may be used during subsequent speech-recognition operations (e.g., operations performed by speech recognition module 220 and/or feature mapping module 260 in FIG. 2.), thereby potentially improving the accuracy of the speech-recognition operations.

FIG. 7 illustrates example feature mapping functions 794. Machine learning module 564 may use mapping module 570 to determine feature mapping functions 794 over time, based upon analysis of acoustic features that are determined from simulated audible sounds generated by speech simulation module 565 and room simulation module 566 (e.g., such as shown in FIG. 6). Mapping module 570 may determine acoustic features that are associated with audible sounds for any number of different distances. For instance, as shown in FIG. 7, mapping module 570 may determine acoustic features 790 for audible sounds associated with a first distance ("Distance (1)"), acoustic features 792 for audible sounds associated with a Kth distance ("Distance (K)"), and acoustic features 796 for audible sounds associated with an Mth distance ("Distance (M)"). The Mth distance may comprise the reference distance described in examples above.

Mapping module 570 may determine, based on one or more machine learning operations (e.g., operations associated with LSTM (Long Short-Term Memory) networks), one or more of feature mapping functions 794 that are configured to map or transform acoustic features 790 to acoustic features 796. Similarly, mapping module 570 may determine, based on the machine learning operations, one or more of feature mapping functions 794 that are configured to map or transform acoustic features 792 to acoustic features 796. In such fashion, feature mapping functions 794 are configured to map or transform acoustic features associated with one or more distances, other than a reference distance, to normalized acoustic features associated with a reference or baseline distance.

Mapping module 570 may store feature mapping functions 794 in storage devices 548. If computing system 528 is external to and separate from computing system 210 shown in FIG. 2, computing system 528 may provide feature mapping functions 794 to computing system 210 for storage (e.g., in storage devices 248) and use by feature mapping module 260 of speech recognition module 220. The training environments and real-time speech recognition environments may be similar or even substantially matched through the use of such mapping functions that map acoustic features associated with audible sounds detected at a particular distance to normalized acoustic features that are associated with audible sounds at a reference distance (e.g., reference "Distance (M)" shown in FIG. 4, "Distance (M)" shown in FIG. 7), thereby normalizing the acoustic features that are determined during the speech recognition process with respect to distance.

Figure 8:
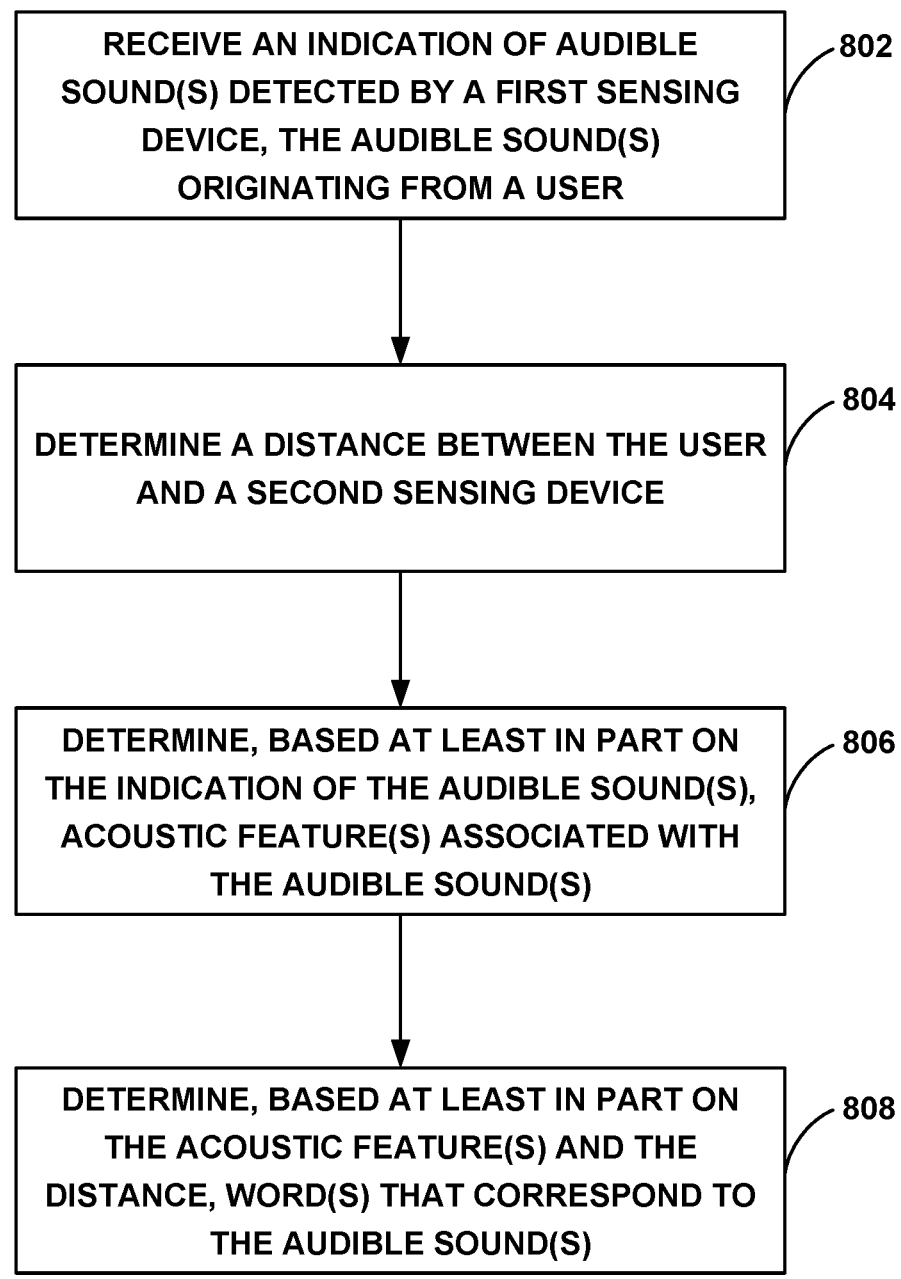
FIG. 8 is a flow diagram illustrating example operations of an example computing system that is configured to determine one or more words of a user, in accordance with one or more aspects of the present disclosure.

FIG. 8 is a flow diagram illustrating example operations of an example computing system that is configured to determine one or more words of a user, in accordance with one or more aspects of the present disclosure. For purposes of illustration only, FIG. 8 is described below within the example context of computing system 110 of FIG. 1.

In the flow diagram illustrated FIG. 8, a computing system (e.g., computing system 110) is configured to receive (802) an indication of one or more audible sounds (e.g., audible sounds 134) that are detected by a first sensing device (e.g., first sensing device 114). The one or more audible sounds originate from a user (e.g., user 130).

The computing system (e.g., computing system 110 using distance module 118) is further configured to determine (804), based at least in part on an indication of one or more signals (e.g., signals 136) detected by a second sensing device (e.g., second sensing device 116), a distance (e.g., distance 138) between the user and the second sensing device, where the second sensing device is different from the first sensing device. The computing system (e.g., computing system 110 using speech recognition module 120) is further configured to determine (806), based at least in part on the indication of the one or more audible sounds, one or more acoustic features that are associated with the one or more audible sounds. In addition, the computing system is configured to determine (808), based at least in part on the one or more acoustic features and the distance between the user and the second sensing device, one or more words that correspond to the one or more audible sounds.

The following numbered examples may illustrate one or more aspects of the present disclosure.

Example 1

A method of performing speech recognition, the method comprising: receiving, by a computing system having one or more processors, an indication of one or more audible sounds that are detected by a first sensing device, the one or more audible sounds originating from a user; determining, by the computing system and based at least in part on an indication of one or more signals detected by a second sensing device, a distance between the user and the second sensing device, the second sensing device being different from the first sensing device; determining, by the computing system and based at least in part on the indication of the one or more audible sounds, one or more acoustic features that are associated with the one or more audible sounds; and determining, by the computing system, and based at least in part on the one or more acoustic features and the distance between the user and the second sensing device, one or more words that correspond to the one or more audible sounds.

Example 2

The method of Example 1, wherein the first sensing device comprises a microphone, wherein the second sensing device comprises a camera, and wherein the computing system includes at least one of the first sensing device or the second sensing device.

Example 3

The method of any of Examples 1-2, wherein determining the distance between the user and the second sensing device comprises: determining, by the computing system and based at least in part on the indication of the one or more signals detected by the second sensing device, a size of a head of the user; and determining, by the computing system and based at least in part on the size of the head of the user, the distance between the user and the second sensing device.

Example 4

The method of any of Examples 1-3, wherein determining the distance between the user and the second sensing device comprises: determining, by the computing system and based at least in part on the indication of the one or more signals detected by the second sensing device, a distance between eyes of the user; and determining, by the computing system and based at least in part on the distance between the eyes of the user, the distance between the user and the second sensing device.

Example 5

The method of any of Examples 1-4, wherein determining the one or more words that correspond to the one or more audible sounds comprises: providing, by the computing system and as input into an acoustic model, the one or more acoustic features associated with the one or more audible sounds and the distance between the user and the second sensing device; and receiving, by the computing system and as output from the acoustic model, the one or more words that correspond to the one or more audible sounds.

Example 6

The method of Example 5, wherein the acoustic model is trained from previously received audible sounds that correspond to pre-defined words in the acoustic model, and wherein the pre-defined words are associated with pre-defined acoustic features in the acoustic model.

Example 7

The method of Example 6, wherein the pre-defined words are further associated with pre-defined distance features in the acoustic model, and wherein receiving, as output from the acoustic model, the one or more words that correspond to the one or more audible sounds comprises: determining, by the computing system and using the acoustic model, a distance feature from the pre-defined distance features, wherein the distance feature corresponds to the distance between the user and the second sensing device; determining, by the computing system and based at least in part on the distance feature and the one or more acoustic features associated with the one or more audible sounds, at least one pre-defined acoustic feature from the pre-defined acoustic features in the acoustic model; and determining, by the computing system and based at least in part on the at least one pre-defined acoustic feature, the one or more words from the pre-defined words in the acoustic model.

Example 8

The method of Example 7, wherein each of the pre-defined distance features in the acoustic model is stacked with one or more groups of the pre-defined acoustic features in the acoustic model, wherein each of the one or more groups includes one or more of the pre-defined acoustic features.

Example 9

The method of Example 6, wherein receiving, as output from the acoustic model, the one or more words that correspond to the one or more audible sounds comprises: determining, by the computing system and based at least in part on the distance between the user and the second sensing device and also on a reference distance, a feature mapping function; mapping, by the computing system and using the feature mapping function, the one or more acoustic features associated with the one or more audible sounds into one or more normalized acoustic features at the reference distance; and determining, by the computing system and based at least in part on the one or more normalized acoustic features, the one or more words from the pre-defined words in the acoustic model.

Example 10

The method of Example 9, further comprising: prior to receiving the indication of the one or more audible sounds that are detected by the first sensing device, executing, by the computing system, a simulation application at least by: receiving, by the computing system, an indication of a first group of audible sounds associated with the first distance feature, the first group of audible sounds corresponding to one or more spoken words; receiving, by the computing system, an indication of a second group of audible sounds associated with the second distance feature, the second group of audible sounds also corresponding to the one or more spoken words; determining, by the computing system and based at least in part on the indication of the first group of audible sounds, one or more first groups of acoustic features that are associated with the first group of audible sounds; determining, by the computing system and based at least in part on the indication of the second group of audible sounds, one or more second groups of acoustic features that are associated with the second group of audible sounds; performing, by the computing system, and based at least in part on the one or more first groups of acoustic features and on the one or more second groups of acoustic features, one or more machine learning operations to determine the feature mapping operation that is configured to map the one or more first groups of acoustic features associated with the first distance feature to the one or more second groups of acoustic features associated with the second distance feature; and storing, by the computing system, the feature mapping operation.

Example 11

The method of Example 10, wherein the first group of audible sounds are further associated with a first group of room configuration parameters that are determined by the simulation application, and wherein the second group of audible sounds are further associated with a second group of room configuration parameters that are determined by the simulation application.

Example 12

The method of any of Examples 1-11, wherein the one or more acoustic features associated with the one or more audible sounds include one or more of a Mel-Frequency Cepstral Coefficient feature, a Perceptual Linear Prediction feature, a Filter-bank Coefficients feature, a Complex Fast Fourier Transform feature, or a raw waveform feature associated with the one or more audible sounds.

Example 13

A computing system comprising means for performing the method of any of Examples 1-12.

Example 14

A computer-readable storage device storing instructions that, when executed by at least one processor, cause the at least one processor to perform the method of any of Examples 1-12.

Example 15

A computing system, comprising: at least one processor; and at least one computer-readable storage device storing instructions that, when executed by the at least one processor, cause the at least one processor to: receive an indication of one or more audible sounds that are detected by a first sensing device, the one or more audible sounds originating from a user; determine, based at least in part on an indication of one or more signals detected by a second sensing device, a distance between the user and the second sensing device, the second sensing device being different from the first sensing device; determine, based at least in part on the indication of the one or more audible sounds, one or more acoustic features that are associated with the one or more audible sounds; and determine, based at least in part on the one or more acoustic features and the distance between the user and the second sensing device, one or more words that correspond to the one or more audible sounds.

Example 16

The computing system of Example 15, wherein the computing system includes at least one of the first sensing device or the second sensing device, wherein the first sensing device comprises a microphone, and wherein the second sensing device comprises a camera.

Example 17

The computing system of any of Examples 15-16, wherein determining the distance between the user and the second sensing device comprises: determining, by the computing system and based at least in part on the indication of the one or more signals detected by the second sensing device, a size of a head of the user; and determining, by the computing system and based at least in part on the size of the head of the user, the distance between the user and the second sensing device.

Example 18

The computing system of any of Examples 15-17, wherein determining the distance between the user and the second sensing device comprises: determining, by the computing system and based at least in part on the indication of the one or more signals detected by the second sensing device, a distance between eyes of the user; and determining, by the computing system and based at least in part on the distance between the eyes of the user, the distance between the user and the second sensing device.

Example 19

The computing system of any of Examples 15-18, wherein the instructions stored on the at least one computer-readable storage device that cause the at least one processor to determine the one or more words that correspond to the one or more audible sounds further cause the at least one processor to: provide, as input into an acoustic model, the one or more acoustic features associated with the one or more audible sounds and the distance between the user and the second sensing device; and receive, as output from the acoustic model, the one or more words that correspond to the one or more audible sounds.

Example 20

The computing system of Example 19, wherein the acoustic model is trained from previously received audible sounds that correspond to pre-defined words in the acoustic model, and wherein the pre-defined words are associated with pre-defined acoustic features in the acoustic model.

Example 21

The computing system of Example 20, wherein the pre-defined words are further associated with pre-defined distance features in the acoustic model, and wherein the instructions stored on the at least one computer-readable storage device that cause the at least one processor to receive, as output from the acoustic model, the one or more words that correspond to the one or more audible sounds further cause the at least one processor to: determine, using the acoustic model, a distance feature from the pre-defined distance features, wherein the distance feature corresponds to the distance between the user and the second sensing device; determine, based at least in part on the distance feature and the one or more acoustic features associated with the one or more audible sounds, at least one pre-defined acoustic feature from the pre-defined acoustic features in the acoustic model; and determine, based at least in part on the at least one pre-defined acoustic feature, the one or more words from the pre-defined words in the acoustic model.

Example 22

The computing system of Example 21, wherein each of the pre-defined distance features in the acoustic model is stacked with one or more groups of the pre-defined acoustic features in the acoustic model, wherein each of the one or more groups includes one or more of the pre-defined acoustic features.

Example 23

The computing system of Example 20, wherein the instructions stored on the at least one computer-readable storage device that cause the at least one processor to receive, as output from the acoustic model, the one or more words that correspond to the one or more audible sounds further cause the at least one processor to: determine, based at least in part on the distance between the user and the second sensing device and also on a reference distance, a feature mapping function; map, using the feature mapping function, the one or more acoustic features associated with the one or more audible sounds into one or more normalized acoustic features at the reference distance; and determine, based at least in part on the one or more normalized acoustic features, the one or more words from the pre-defined words in the acoustic model.

Example 24

The computing system of Example 23, wherein the instructions stored on the at least one computer-readable storage device further cause the at least one processor to: prior to receiving the indication of the one or more audible sounds that are detected by the first sensing device, receive an indication of a first group of audible sounds associated with the first distance feature, the first group of audible sounds corresponding to one or more spoken words; receive an indication of a second group of audible sounds associated with the second distance feature, the second group of audible sounds also corresponding to the one or more spoken words; determine, based at least in part on the indication of the first group of audible sounds, one or more first groups of acoustic features that are associated with the first group of audible sounds; determine, based at least in part on the indication of the second group of audible sounds, one or more second groups of acoustic features that are associated with the second group of audible sounds; perform, based at least in part on the one or more first groups of acoustic features and on the one or more second groups of acoustic features, one or more machine learning operations to determine the feature mapping operation that is configured to map the one or more first groups of acoustic features associated with the first distance feature to the one or more second groups of acoustic features associated with the second distance feature; and store the feature mapping operation.

Example 25

The computing system of Example 24, wherein the first group of audible sounds are further associated with a first group of room configuration parameters that are determined by the simulation application, and wherein the second group of audible sounds are further associated with a second group of room configuration parameters that are determined by the simulation application.

Example 26

The computing system of any of Examples 15-25, wherein the one or more acoustic features associated with the one or more audible sounds include one or more of a Mel-Frequency Cepstral Coefficient feature, a Perceptual Linear Prediction feature, a Filter-bank Coefficients feature, a Complex Fast Fourier Transform feature, or a raw waveform feature associated with the one or more audible sounds.

Example 27

A computer-readable storage device storing instructions that, when executed by at least one processor, cause the at least one processor to perform operations comprising: receiving an indication of one or more audible sounds that are detected by a first sensing device, the one or more audible sounds originating from a user; determining, based at least in part on an indication of one or more signals detected by a second sensing device, a distance between the user and the second sensing device, the second sensing device being different from the first sensing device; determining, based at least in part on the indication of the one or more audible sounds, one or more acoustic features that are associated with the one or more audible sounds; and determining, based at least in part on the one or more acoustic features and the distance between the user and the second sensing device, one or more words that correspond to the one or more audible sounds.

Example 28

The computer-readable storage device of Example 27, wherein the computing system includes at least one of the first sensing device or the second sensing device, wherein the first sensing device comprises a microphone, and wherein the second sensing device comprises a camera.

Example 29

The computer-readable storage device of any of Examples 27-28, wherein determining the distance between the user and the second sensing device comprises: determining, by the computing system and based at least in part on the indication of the one or more signals detected by the second sensing device, a size of a head of the user; and determining, by the computing system and based at least in part on the size of the head of the user, the distance between the user and the second sensing device.

Example 30

The computer-readable storage device of any of Examples 27-29, wherein determining the distance between the user and the second sensing device comprises: determining, by the computing system and based at least in part on the indication of the one or more signals detected by the second sensing device, a distance between eyes of the user; and determining, by the computing system and based at least in part on the distance between the eyes of the user, the distance between the user and the second sensing device.

Example 31

The computer-readable storage device of any of Examples 27-30, wherein determining the one or more words that correspond to the one or more audible sounds comprises: providing, as input into an acoustic model, the one or more acoustic features associated with the one or more audible sounds and the distance between the user and the second sensing device; and receiving, as output from the acoustic model, the one or more words that correspond to the one or more audible sounds.

Example 32

The computer-readable storage device of Example 31, wherein the acoustic model is trained from previously received audible sounds that correspond to pre-defined words in the acoustic model, and wherein the pre-defined words are associated with pre-defined acoustic features in the acoustic model.

Example 33

The computer-readable storage device of Example 32, wherein the pre-defined words are further associated with pre-defined distance features in the acoustic model, and wherein receiving, as output from the acoustic model, the one or more words that correspond to the one or more audible sounds comprises: determining, using the acoustic model, a distance feature from the pre-defined distance features, wherein the distance feature corresponds to the distance between the user and the second sensing device; determining, based at least in part on the distance feature and the one or more acoustic features associated with the one or more audible sounds, at least one pre-defined acoustic feature from the pre-defined acoustic features in the acoustic model; and determining, based at least in part on the at least one pre-defined acoustic feature, the one or more words from the pre-defined words in the acoustic model.

Example 34

The computer-readable storage device of Example 33, wherein each of the pre-defined distance features in the acoustic model is stacked with one or more groups of the pre-defined acoustic features in the acoustic model, wherein each of the one or more groups includes one or more of the pre-defined acoustic features.

Example 35

The computer-readable storage device of Example 32, wherein receiving, as output from the acoustic model, the one or more words that correspond to the one or more audible sounds comprises: determining, based at least in part on the distance between the user and the second sensing device and also on a reference distance, a feature mapping function; mapping, using the feature mapping function, the one or more acoustic features associated with the one or more audible sounds into one or more normalized acoustic features at the reference distance; and determining, based at least in part on the one or more normalized acoustic features, the one or more words from the pre-defined words in the acoustic model.

Example 36

The computer-readable storage device of Example 35, wherein the operations further comprise: prior to receiving the indication of the one or more audible sounds that are detected by the first sensing device, executing a simulation application at least by: receiving an indication of a first group of audible sounds associated with the first distance feature, the first group of audible sounds corresponding to one or more spoken words; receiving an indication of a second group of audible sounds associated with the second distance feature, the second group of audible sounds also corresponding to the one or more spoken words; determining, based at least in part on the indication of the first group of audible sounds, one or more first groups of acoustic features that are associated with the first group of audible sounds; determining, based at least in part on the indication of the second group of audible sounds, one or more second groups of acoustic features that are associated with the second group of audible sounds; performing, based at least in part on the one or more first groups of acoustic features and on the one or more second groups of acoustic features, one or more machine learning operations to determine the feature mapping operation that is configured to map the one or more first groups of acoustic features associated with the first distance feature to the one or more second groups of acoustic features associated with the second distance feature; and storing the feature mapping operation.

Example 37

The computer-readable storage device of Example 36, wherein the first group of audible sounds are further associated with a first group of room configuration parameters that are determined by the simulation application, and wherein the second group of audible sounds are further associated with a second group of room configuration parameters that are determined by the simulation application.

Example 38

The computer-readable storage device of any of Examples 27-37, wherein the one or more acoustic features associated with the one or more audible sounds include one or more of a Mel-Frequency Cepstral Coefficient feature, a Perceptual Linear Prediction feature, a Filter-bank Coefficients feature, a Complex Fast Fourier Transform feature, or a raw waveform feature associated with the one or more audible sounds.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of performing speech recognition, the method comprising:
   receiving an indication of a first group of audible sounds associated with a first distance feature, the first group of audible sounds corresponding to one or more spoken words:
   receiving an indication of a second group of audible sounds associated with a second distance feature, the second group of audible sounds also corresponding to the one or more spoken words;
   determining, based at least in part on the indication of the first group of audible sounds, one or more first groups of acoustic features that are associated with the first group of audible sounds;
   determining, based at least in part on the indication of the second group of audible sounds, one or more second groups of acoustic features that are associated with the second group of audible sounds;
   performing, based at least in part on the one or more first groups of acoustic features and on the one or more second groups of acoustic features, one or more machine learning operations to determine a feature mapping operation that is configured to map the one or more first groups of acoustic features associated with the first distance feature to the one or more second groups of acoustic features associated with the second distance feature;
   storing the feature mapping operation;
   subsequent to storing the feature mapping operation:
      receiving, by a computing system having one or more processors, an indication of one or more audible sounds that are detected by a first sensing device, the one or more audible sounds originating from a user;
      determining, by the computing system and based at least in part on an indication of one or more signals detected by a second sensing device, a distance between the user and the second sensing device, the second sensing device being different from the first sensing device;

determining, by the computing system and based at least in part on the indication of the one or more audible sounds, one or more acoustic features that are associated with the one or more audible sounds; and determining, by the computing system, and based at least in part on the one or more acoustic features and the distance between the user and the second sensing device, one or more words that correspond to the one or more audible sounds, wherein determining the one or more words that correspond to the one or more audible sounds comprises:

mapping, using the distance between the user and the second sensing device and using the stored feature mapping operation, the one or more acoustic features associated with the one or more audible sounds into one or more normalized acoustic features, and determining the one or more words based on processing the one or more normalized acoustic features using a trained acoustic model.

2. The method of claim 1, wherein the computing system includes at least one of the first sensing device or the second sensing device, wherein the first sensing device comprises a microphone, and wherein the second sensing device comprises a camera.

3. The method of claim 1, wherein determining the distance between the user and the second sensing device comprises:

determining, by the computing system and based at least in part on the indication of the one or more signals detected by the second sensing device, a size of a head of the user; and determining, by the computing system and based at least in part on the size of the head of the user, the distance between the user and the second sensing device.

4. The method of claim 1, wherein determining the distance between the user and the second sensing device comprises:

determining, by the computing system and based at least in part on the indication of the one or more signals detected by the second sensing device, a distance between eyes of the user; and determining, by the computing system and based at least in part on the distance between the eyes of the user, the distance between the user and the second sensing device.

5. The method of claim 1, wherein the acoustic model is trained from previously received audible sounds that correspond to pre-defined words in the acoustic model, and wherein the pre-defined words are associated with pre-defined acoustic features in the acoustic model.

6. The method of claim 1, wherein the first group of audible sounds are further associated with a first group of room configuration parameters that are determined by the simulation application, and wherein the second group of audible sounds are further associated with a second group of room configuration parameters that are determined by the simulation application.

7. The method of claim 1, wherein the one or more acoustic features associated with the one or more audible sounds include one or more of a Mel-Frequency Cepstral Coefficient feature, a Perceptual Linear Prediction feature, a Filter-bank Coefficients feature, a Complex Fast Fourier Transform feature, or a raw waveform feature associated with the one or more audible sounds.

8. A computing system, comprising:

at least one processor; and at least one computer-readable storage device storing instructions that, when executed by the at least one processor, cause the at least one processor to:

receive an indication of a first group of audible sounds associated with a first distance feature, the first group of audible sounds corresponding to one or more spoken words;

receive an indication of a second group of audible sounds associated with a second distance feature, the second group of audible sounds also corresponding to the one or more spoken words;

determine, based at least in part on the indication of the first group of audible sounds, one or more first groups of acoustic features that are associated with the first group of audible sounds;

determine, based at least in part on the indication of the second group of audible sounds, one or more second groups of acoustic features that are associated with the second group of audible sounds:

perform, based at least in part on the one or more first groups of acoustic features and on the one or more second groups of acoustic features, one or more machine learning operations to determine a feature mapping operation that is configured to map the one or more first groups of acoustic features associated with the first distance feature to the one or more second groups of acoustic features associated with the second distance feature;

store the feature mapping operation;

subsequent to storing the feature mapping operation:

receive an indication of one or more audible sounds that are detected by a first sensing device, the one or more audible sounds originating from a user;

determine, based at least in part on an indication of one or more signals detected by a second sensing device, a distance between the user and the second sensing device, the second sensing device being different from the first sensing device;

determine, based at least in part on the indication of the one or more audible sounds, one or more acoustic features that are associated with the one or more audible sounds; and determine, based at least in part on the one or more acoustic features and the distance between the user and the second sensing device, one or more words that correspond to the one or more audible sounds, wherein the instructions that cause the at least one processor to determine the one or more words that correspond to the one or more audible sounds comprise instructions to:

map, using the distance between the user and the second sensing device and using the stored feature mapping operation, the one or more acoustic features associated with the one or more audible sounds into one or more normalized acoustic features, and determine the one or more words based on processing the one or more normalized acoustic features using a trained acoustic model.

9. The computing system of claim 8, wherein the computing system includes at least one of the first sensing device or the second sensing device, wherein the first sensing device comprises a microphone, and wherein the second sensing device comprises a camera.

10. The computing system of claim 8, wherein the acoustic model is trained from previously received audible sounds that correspond to pre-defined words in the acoustic model, and wherein the pre-defined words are associated with pre-defined acoustic features in the acoustic model.

11. A computer-readable storage device storing instructions that, when executed by at least one processor, cause the at least one processor to perform operations comprising:
   receiving an indication of a first group of audible sounds associated with a first distance feature, the first group of audible sounds corresponding to one or more spoken words;
   receiving an indication of a second group of audible sounds associated with a second distance feature, the second group of audible sounds also corresponding to the one or more spoken words;
   determining, based at least in part on the indication of the first group of audible sounds, one or more first groups of acoustic features that are associated with the first group of audible sounds;
   determining, based at least in part on the indication of the second group of audible sounds, one or more second groups of acoustic features that are associated with the second group of audible sounds;
   performing, based at least in part on the one or more first groups of acoustic features and on the one or more second groups of acoustic features, one or more machine learning operations to determine a feature mapping operation that is configured to map the one or more first groups of acoustic features associated with the first distance feature to the one or more second groups of acoustic features associated with the second distance feature;
   storing the feature mapping operation; and
   subsequent to storing the feature mapping operation:
      receiving an indication of one or more audible sounds that are detected by a first sensing device, the one or more audible sounds originating from a user;
      determining, based at least in part on an indication of one or more signals detected by a second sensing device, a distance between the user and the second sensing device, the second sensing device being different from the first sensing device;
      determining, based at least in part on the indication of the one or more audible sounds, one or more acoustic features that are associated with the one or more audible sounds; and
      determining, based at least in part on the one or more acoustic features and the distance between the user and the second sensing device, one or more words that correspond to the one or more audible sounds, wherein determining the one or more words that correspond to the one or more audible sounds comprises:
         mapping, using the distance between the user and the second sensing device and using the stored feature mapping operation, the one or more acoustic features associated with the one or more audible sounds into one or more normalized acoustic features, and
         determining the one or more words based on processing the one or more normalized acoustic features using a trained acoustic model.

12. The computer-readable storage device of claim 11, wherein the acoustic model is trained from previously received audible sounds that correspond to pre-defined words in the acoustic model, and wherein the pre-defined words are associated with pre-defined acoustic features in the acoustic model.

* * * * *